United States Patent
Gothi et al.

(10) Patent No.: US 9,928,337 B2
(45) Date of Patent: Mar. 27, 2018

(54) INTEGRATED CIRCUIT AND DESIGN METHOD FOR SAME

(71) Applicant: SAMSUNG ELECTRONICS CO., LTD., Suwon-si, Gyeonggi-Do (KR)

(72) Inventors: Abhishek Gothi, Suwon-si (KR); Kodanda Rama Reddy Srinivasa, Suwon-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 0 days.

(21) Appl. No.: 15/376,261

(22) Filed: Dec. 12, 2016

(65) Prior Publication Data
US 2017/0308638 A1  Oct. 26, 2017

(30) Foreign Application Priority Data
Apr. 26, 2016  (KR) .................. 10-2016-0051107

(51) Int. Cl.
  *G06F 17/50*  (2006.01)
  *H03K 3/356*  (2006.01)
  *H03K 3/3562*  (2006.01)

(52) U.S. Cl.
  CPC ...... *G06F 17/5081* (2013.01); *G06F 17/5031* (2013.01); *H03K 3/35625* (2013.01)

(58) Field of Classification Search
  CPC ............ G06F 17/5081; G06F 17/5031; H03K 3/356104
  USPC ......................................... 716/111, 112, 113
  See application file for complete search history.

(56) References Cited

U.S. PATENT DOCUMENTS

| | | | |
|---|---|---|---|
| 6,895,540 B2 | 5/2005 | Chen et al. | |
| 7,290,234 B2 * | 10/2007 | Shibayama | G06F 17/5068 716/119 |
| 7,523,419 B2 * | 4/2009 | Furuki et al. | G06F 17/5077 716/118 |
| 7,624,369 B2 * | 11/2009 | Graur et al. | G03F 1/36 716/54 |
| 7,649,395 B2 | 1/2010 | Ahmadi | |
| 7,843,214 B2 | 11/2010 | Tatsumi | |
| 8,316,340 B2 | 11/2012 | Chen | |
| 8,601,427 B2 | 12/2013 | Kawagoe | |
| 9,026,975 B2 * | 5/2015 | Song et al. | G06F 17/5081 703/14 |
| 9,122,823 B2 | 9/2015 | Agarwal et al. | |
| 2015/0036447 A1 | 2/2015 | Wells et al. | |
| 2015/0113345 A1 | 4/2015 | Chen et al. | |

FOREIGN PATENT DOCUMENTS

| | | |
|---|---|---|
| JP | 5236300 B2 | 7/2013 |
| KR | 1020150016908 A | 2/2015 |

* cited by examiner

*Primary Examiner* — Sun Lin
(74) *Attorney, Agent, or Firm* — Volentine & Whitt, PLLC

(57) ABSTRACT

A computer-implemented method for designing an integrated circuit includes: performing a simulation on input data or an initial layout to determine whether or not a design constraint has been violated. Upon determining that the design constraint has been violated, a redesign layout is created by adding a cutting area without changing a size of the integrated circuit. The adding a cutting area separates at least one of an active region and a gate line. At least one of the initial layout and the redesign layout is stored in a non-transitory computer readable storage medium.

20 Claims, 20 Drawing Sheets

FIG. 15
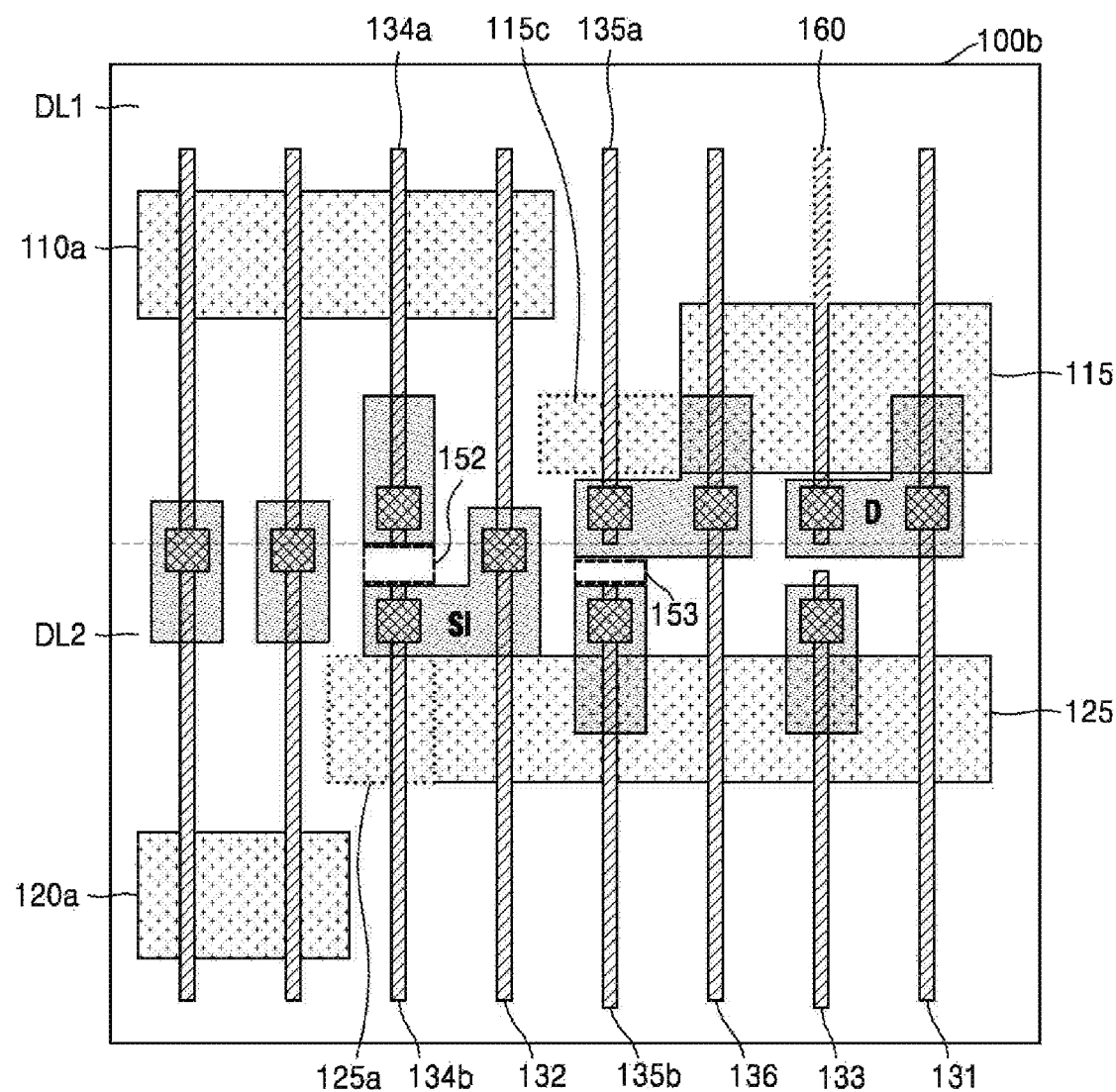
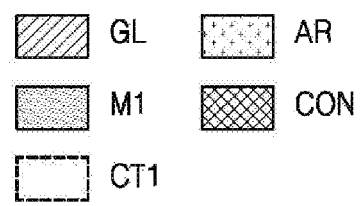

INTEGRATED CIRCUIT AND DESIGN METHOD FOR SAME

BACKGROUND

The inventive concept relates to integrated circuit(s), and more particularly, to computer-implemented method(s) for designing and/or manufacturing integrated circuit(s).

The design and manufacture of integrated circuits is a highly complex process. The evolution of integrated circuits is characterized by an increasing integration density of the constituent elements. In order to obtain a reliable integrated circuit at the end of the design and manufacturing process, a number of design constraints (e.g., element proximity, signal timing, power consumption, etc.) are usually defined in order to protect the integrity of the overall design. As integration density increases, the possibility of violating one or more design constraint(s) rises.

The evolution of integrated circuits is also characterized by a desire to reduce or minimize the physical size of and/or the power consumed by the integrated circuit (or the incorporating semiconductor chip). Unfortunately, as the number of design constraints for an integrated circuit increases, corresponding efforts to satisfy the design constraints tend to drive up physical size and/or power consumption. For example, efforts to satisfy a particular timing constraint for an integrated circuit may result in the addition of a buffer cell (or analogous delay element) in order to improve hold time margin(s). Alternately or additionally, efforts to satisfy a particular noise constraint for an integrated circuit may result in the addition of a decoupling capacitor. Such efforts tend to increase the physical size and/or power consumption of the integrated circuit.

SUMMARY

Certain embodiments of the inventive concept provide integrated circuit(s) capable of satisfying relevant design constraints, without necessarily increasing the physical size of the integrated circuit. Other embodiments of the inventive concept provide computer-implemented method(s) of designing integrated circuits, such that the physical size of the integrated circuit is not increased.

According to an aspect of the inventive concept, there is provided a computer-implemented method for designing an integrated circuit. The method includes; receiving input data defining the integrated circuit characterized by at least one design constraint, performing a simulation using the input data that determines whether or not the at least one design constraint has been violated, upon determining that the at least one design constraint has not been violated, creating an initial layout based on the input data, wherein the initial layout includes at least one active area and at least one gate line and defines a size of the integrated circuit, upon determining that the at least one design constraint has been violated, creating a redesign layout by adding at least one cutting area to the initial layout without changing the size of the integrated circuit, wherein the adding of the at least one cutting area separates at least one of the at least one active region, and the at least one gate line, and storing at least one of the initial layout and redesign layout in a computer readable storage medium.

According to an aspect of the inventive concept, there is provided a computer-implemented design method for an integrated circuit. The method includes; designing an initial layout for the integrated circuit to incorporate a standard cell by referencing the standard cell in a standard cell library stored in computer readable storage medium. The standard cell includes; first, second and third active regions extending in a first direction, gate lines extending in a second direction substantially perpendicular to the first direction, a dummy gate line extending in parallel with the gate lines, and source/drain contacts disposed on opposing sides of the dummy gate line. The source/drain contacts are disposed on the third active region and have a same voltage is applied thereto, and the third active region is disposed under the dummy gate line, such that the combination of the dummy gate line and the third active region constitutes a decoupling capacitor within the integrated circuit.

According to an aspect of the inventive concept, there is provided a computer-implemented method for designing an integrated circuit. The method includes; performing a timing analysis on an initial layout for the integrated circuit, wherein the initial layout includes a data input pin and a scan input pin and defines a size of the integrated circuit, and upon determining as a result of the timing analysis that a hold time violation has occurred, creating a redesign layout based on the initial layout, wherein the redesign layout includes at least one of a dummy gate load added to the initial layout proximate to at least one the data input pin and the scan input pin, and a series stacked transistor added to the initial layout proximate to at least one of the data input pins and the scan input pins.

BRIEF DESCRIPTION OF THE DRAWINGS

Embodiments of the inventive concept may be more readily understood from the following detailed description taken in conjunction with the accompanying drawings in which:

FIG. 15 illustrates an example of a layout in which the scan flip-flop of FIG. 11 is redesigned using the multiplexer of FIG. 14;

DETAILED DESCRIPTION

Figure 1:
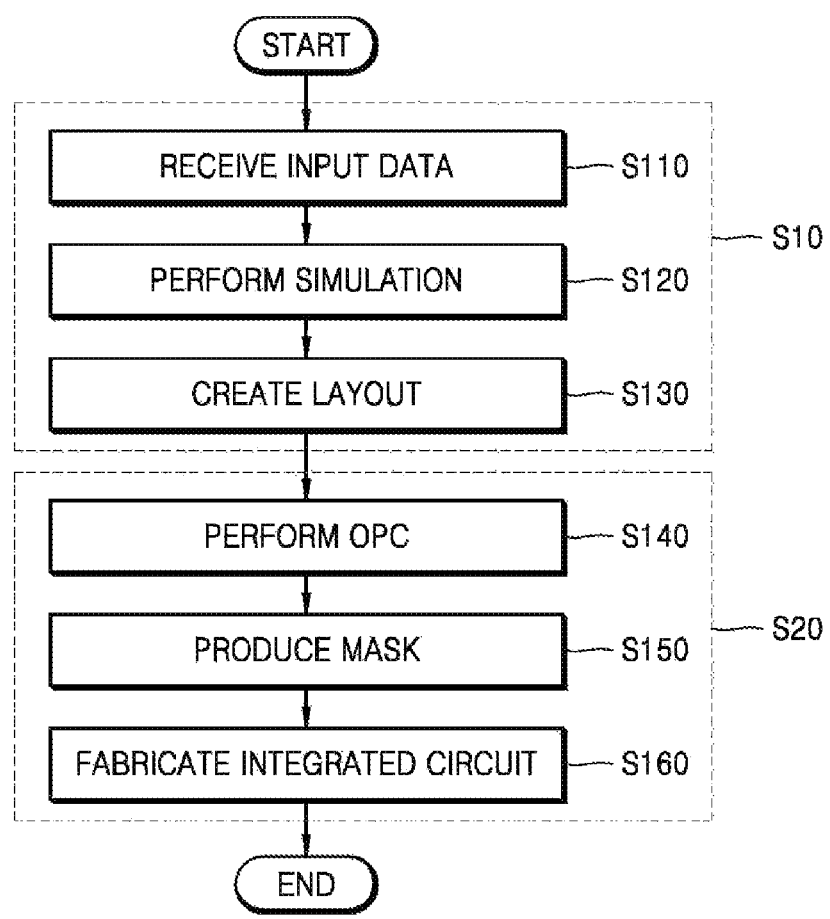
FIG. 1 is a flowchart of a method of manufacturing an integrated circuit, according to an embodiment.

FIG. 1 is a flowchart illustrating a method that may be used to design and/or manufacture an integrated circuit according to an embodiment of the inventive concept. The method of FIG. 1 generally comprises a design process for the integrated circuit S10 and a manufacturing process for the integrated circuit S20.

The design process S10 results in one or more layout(s) describing the integrated circuit, and may be performed by an integrated circuit design tool (e.g., a software tool of the type understood by those skilled in the art and capable of being run on a general purpose or specialty computer, such as desktop computer or laptop computer). In this context, the integrated circuit design tool may be one or more program(s) including instructions capable of being executed by a Central Processing Unit (CPU) or processor of the computer. Hence, embodiments of the inventive concept may be referred to as computer-implemented methods for the design of an integrated circuit.

In addition, certain embodiments of the inventive concept may include the manufacturing process for the integrated circuit S20. Here, the manufacturing process S20 may accept the layout(s) generated by the design process S10 as input(s), and thereafter control the manufacturing steps required to ultimately fabricate the integrated circuit.

In the illustrated example of FIG. 1, the design process S10 comprises receiving (and optionally storing in a constituent memory of the computer) certain input data defining the integrated circuit S110. For example, the input data defining the integrated circuit may be an abstract description of the functional/data processing behaviour of the integrated circuit, such as data generated by synthesis of data defined by a register transfer level (RTL). That is, in certain embodiments of the inventive concept, the input data may be a bitstream or a netlist generated by synthesizing integrated circuits defined by a hardware description language (HDL), such as Verilog and a Very High Speed Integrated Circuit (VHSIC) hardware description language (VHDL).

The integrated circuit will include a plurality of cells, where various cells may be stored for reference in a so-called cell library. Different cells in the cell library are characterized by corresponding information, such as name, dimension(s), gate widths, pins, delay characteristics, leakage currents, threshold voltages, and similar functional and structural information. A set of cells in a general cell library may include basic cells (e.g., AND, OR, NOR, and inverter), complex cells (e.g., OAI (OR/AND/INVERTER and AOI (AND/OR/INVERTER)), and/or storage element cells (e.g., scan flip-flop, master-slave flip-flop, and latch).

In the description of embodiments that follows, a cell may be a standard cell, and a cell library may be a standard cell library. Accordingly, a standard cell design method refers to a method of designing a dedicated large scale integrated circuit (LSI) to satisfy one or more design constraints resulting from (e.g.,) a customer or user's specification. A standard design method may include preparing standard cells with multiple functions and voluntarily combining certain standard cells. Standard cells may be registered (or stored for later reference) in the computer following design and verification, and logic design resulting from combined standard cells, placement, and routing may be obtained through the use of computer-aided design (CAD) techniques and tools. No matter the type, source and/or combination of cell(s), each cell, combination of cells, logic design, partial design or overall design will be characterized by one or more design constraints.

Upon receiving the input data S110, the design method S10 of FIG. 1 may perform a simulation using the input data in order to determine whether or not a design constraint has been violated for the integrated circuit S120. The simulation may be used to determine whether the input data (e.g., a provided netlist) satisfies design constraint(s)—possibly including predicting parameters related to (e.g.,) power consumption and/or signal transfer delay. The simulation may be performed by a simulation tool running on the computer, where design constraint(s) may be established as rule(s) and/or restriction(s) imposed on design elements as design references. In the illustrated example of FIG. 1, the simulation performed in response to the input data may be referred to as a pre-layout simulation or a gate-level simulation. Simulations of this type may include a static timing analysis (STA) and/or power analysis, but are not limited to only these examples.

As the result of performing of the simulation S120, the design method S10 of FIG. 1 may create one or more layouts (hereafter, singularly or collectively referred to as "layout") S130. A layout may be created by performing placement and routing based on the results of the simulation. The layout may be a physical indicator (or description) allowing a designed circuit to be transferred onto a semiconductor wafer during the manufacturing process S20. The layout describes integrated circuit patterns, where the patterns correspond to circuits, interconnections, conductive layer patterns, insulating layer patterns, or the like, which are directly associated with the operations of the integrated circuit.

In the foregoing approach an original layout may be iteratively redesigned (i.e., reconfigured) based on the result(s) of one or more simulations until a final layout is created. Thus, an original design may pass through a succession (i.e., 1 or more) of redesigned layouts in response to one or more simulations until a final layout is created. However, according to embodiments of the inventive concept, a redesigned layout need not be substantially larger in physical size than a corresponding initial layout. In this context, a succeeding layout, whether an original layout or a preceding redesigned layout, will hereafter be referred to as an "initial layout" while the succeeding redesigned layout will be referred to as a "redesigned layout." Using these terms, certain embodiments of the inventive concept allow a redesigned layout to be created that is substantially the same physical size as a corresponding initial design. For example, a standard cell included in the redesigned layout may have substantially the same size as a standard cell included in the original layout. This approach and its results will be described in some additional detail with reference to FIGS. 2 and 3.

It should here again be noted, however, that the simulation performed S120 in the design method S10 of FIG. 1 may be a pre-layout simulation (e.g., a simulation including, for example, STA, power analysis, etc.) or a post-layout simulation. Hence, the step of creating the layout S130 may result in an original layout or a redesigned layout, depending on the nature of the simulation S130.

In some embodiments, the STA, power analysis, etc., may be performed during a layout verification or post-layout simulation instead of a pre-layout simulation. In addition, a redesigned layout may be obtained as the result of a layout verification or post-layout simulation.

Once a layout has been generated by the design process S10, the manufacturing process S20 may receive the layout as an input. Here, the same computer running the design process S10 may be used to run the manufacturing process S20. Alternately, the computer running the design process S10 may store the layout on a computer readable storage medium for transfer to a different computer running the manufacturing process S20. Alternately, the layout may be electronically transferred via a connecting network from the computer running the design process S10 to another computer running the manufacturing process S20.

Within the manufacturing process S20, an optical proximity correction (OPC) may be performed on patterns included in the layout S140. OPC may be performed using an OPC tool running on a computer. That is, the OPC tool may be software including instructions executed by a CPU or processor of the computer and stored in a memory of the computer or using a computer readable storage medium. In its operation, for example, the OPC tool may receive layout data using (e.g.,) a graphic database system (GDS) format and thereafter convert the received layout data into data corresponding to the OPC. The OPC may generate changed pattern(s) for the layout as a function of possible layout errors associated with (e.g.,) an optical proximity effect (OPE). With increasing integration density layout patterns become finer, and OPE may be induced between neighboring patterns during an exposure process used during the manufacturing process S20. Therefore, it may be possible to suppress the occurrence of OPE by performing OPC that corrects layout pattern(s) before the layout pattern(s) are transferred to one or more mask(s).

In the illustrated example of FIG. 1, once OPC is performed S140, a mask may be produced S150. The mask may be produced by performing an exposure process on a mask substrate using the corrected layout patterns provided by OPC. Those skilled in the art will recognize that the mask may be produced by performing a series of processes, such as development, etching, cleaning, and baking, after the exposure process.

Once a mask is produced S150, the integrated circuit may be fabricated using the mask S160. That is, a semiconductor device incorporating the integrated circuit may be manufactured by performing various semiconductor processes on a semiconductor substrate, such as a wafer, using the mask. For example, a lithography process may be performed using the mask. Desired patterns may be formed on the semiconductor substrate or a material layer through the patterning process. Additionally or alternately, fabrication of the integrated circuit S160 may include a deposition process, an etching process, an ion process, a cleaning process, and the like. The deposition process may include various processes of forming a material layer, such as chemical vapor deposition (CVD), sputtering, or spin coating. The ion process may include ion implantation, diffusion, thermal treatment, and the like. Also, the semiconductor processes may include a packaging process of mounting a semiconductor device on a printed circuit board (PCB) and sealing the semiconductor device by using a sealant, or may include a test process of testing the semiconductor device or package.

Figure 2:
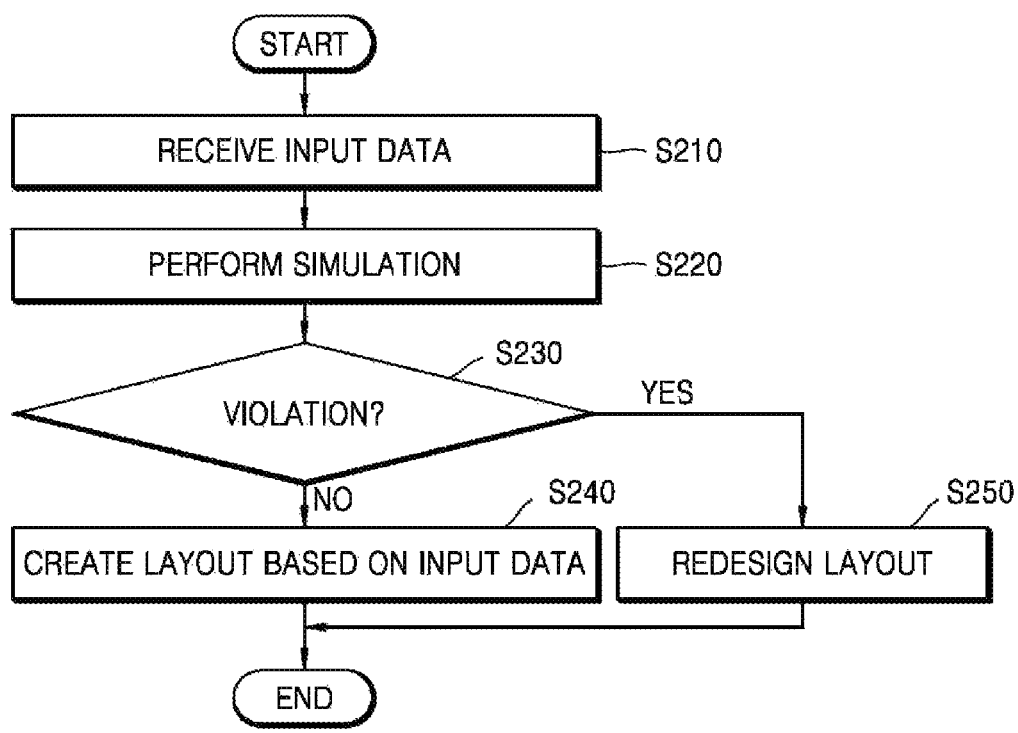
FIG. 2 is a flowchart of a method of designing an integrated circuit, according to an embodiment.

FIG. 2 is a flowchart further illustrating in one example the design method of FIG. 1 according to an embodiment of the inventive concept.

Referring to FIG. 2, the design method for the integrated circuit comprises receiving the input data S210, and performing a simulation S220. The performing of the simulation determines whether or not a design constraint has been violated S230. If no, the design method creates a layout based on the input data S240. For example, a layout may be created based on the input data (e.g., a received netlist) defining an original layout. Hereafter, one example of an original layout will be described in relation to FIG. 11, where the original layout includes active regions extending in a first direction and gate lines extending in a second direction substantially perpendicular to the first direction.

Returning to FIG. 2, if a determination is made that the design constraint has been violated, the initial layout associated with the simulation is redesigned S250. For example, during the redesign of the initial layout to generate a corresponding redesign layout, the initial layout may be changed by adding a cutting area (or cutting layer). The cutting area may be variously defined but will effectively "cut" at least one of an active region or a gate line of the initial layout, thereby adding at least one of a new active region or a new gate line to the initial layout without substantially increasing the size of the initial layout over that of the initial layout.

Figure 3:
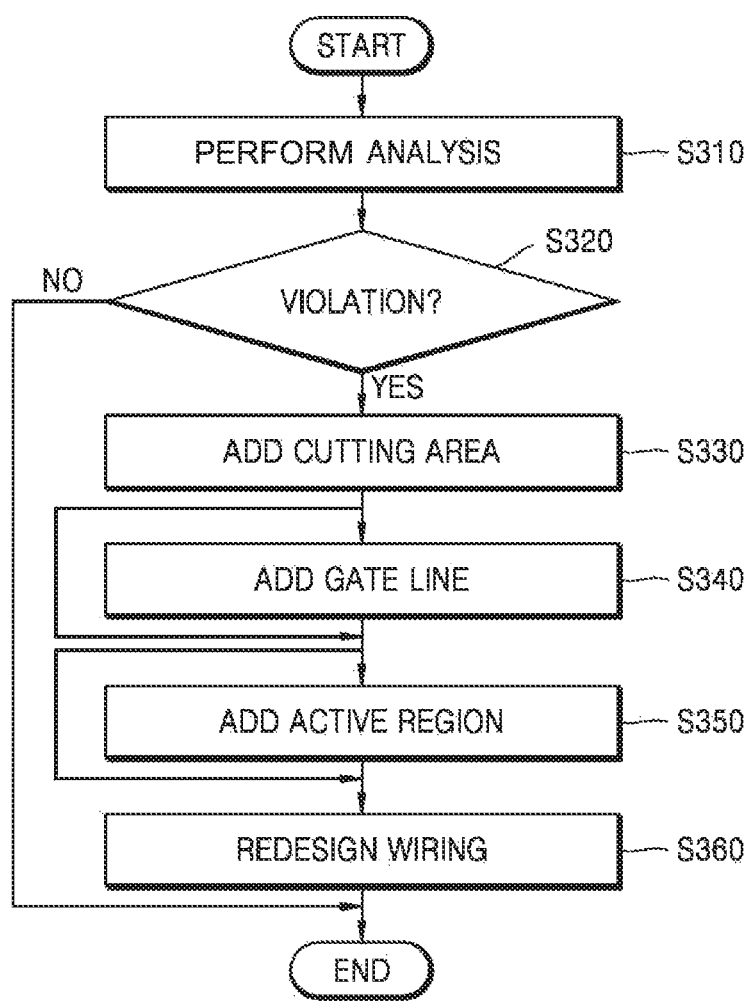
FIG. 3 is a flowchart of a detailed method of designing an integrated circuit, according to an embodiment.

FIG. 3 is a flowchart further describing in one example the step of redesigning the initial layout S250 of the design method of FIG. 2 according to an embodiment of the inventive concept.

Referring to FIG. 3, the redesign step S250 of the design method of FIG. 2 comprises performing an analysis S310, such as at least one of a timing analysis and a power analysis for the integrated circuit. Within the context of the embodiments described in relation to FIGS. 1 and 2, the analysis step of FIG. 3 may be performed as part of a pre-layout simulation or a post-layout simulation. Regardless of the nature of the simulation or analysis used, it will determine whether or not a design constraint has been violated S320. When it is determined that the design constraint has not been violated, the design method ends.

Otherwise, when it is determined that the design constraint has been violated, the design method adds a cutting area S330 to the initial layout. In certain embodiments of the inventive concept, the cutting area will be a cutting layer that cuts an active region. Here, the term "cut" means to separate a previously continuous area or element into at least two parts. For example, the cutting area may be an added cutting layer that separates a gate line in the initial layout into two partial gate lines in a corresponding redesign layout. The adding (or introduction) of the cutting area to the initial layout will not increase the size of the redesign layout over that of the initial layout.

Following the adding of the cutting area S330, the design method of FIG. 3 may (optionally) add a gate line S340. In certain embodiments of the inventive concept, the added gate line may be added to the active region and used as a conductive gate line, or the added gate line may be added to a dummy region as a dummy gate line. The adding of the gate line S340 will not increase the size of the redesign layout over that of the initial layout.

Following the adding of the cutting area S330, the design method of FIG. 3 may (optionally) add an active region S350. In certain embodiments, the added active region may be added under the added gate line of step S340, such that the combination of the added active region and added gate line constitute an added transistor within the redesign layout. In certain other embodiments, the added active region may be added under the added dummy gate line, such that the combination of the added active region and added dummy gate line constitute a decoupling capacitor within the redesign layout.

Following the adding of the cutting area S330, the design method of FIG. 3 may (optionally) redesign wiring of the initial layout S360. For example, wiring of the initial layout may include a first metal line disposed on gate lines of the initial layout, a second metal line disposed the first metal line, and the like. In certain embodiments, a contact may be disposed on the added gate line of S340, where the first metal line is disposed on the contact in order to electrically connect the added gate line to another region. In certain other embodiments, a contact may be disposed on the added active region of S350, and the first metal line may be disposed on the contact in order to electrically connect the added active region to another region. Here, however, the redesign of wiring of the initial layout S360, whether associated with an added gate line, an added active region, or other design feature, will not result in an increase in the size of the redesign layout in relation to the initial layout.

In view of the foregoing description of embodiments, an integrated circuit may be designed to include (e.g.,) a scan flip-flop, as implemented by a standard cell. As an example of the design method for the integrated circuit, a method of redesigning an initial layout of a scan flip-flop based on results of a simulation run in relation to the scan flip-flop will be described hereafter. However, the scan flip-flop is merely one example of many integrated circuits that may be designed (or redesigned) using a design method according to an embodiment of the inventive concept.

Figure 4A:
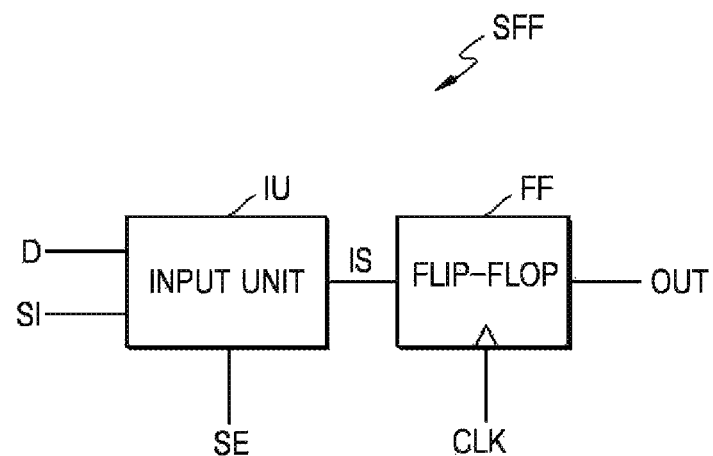
FIG. 4A is a block diagram of a scan flip-flop.
Figure 4B:
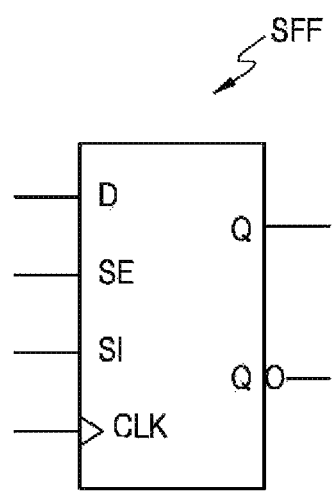
FIG. 4B is a logic symbol representing the scan flip-flop of FIG. 4A.

FIG. 4A is a block diagram illustrating a scan flip-flop SFF and FIG. 4B is a logic symbol representing the scan flip-flop SFF of FIG. 4A.

Referring to FIGS. 4A and 4B, the scan flip-flop SFF may include an input unit IU and a flip-flop FF. The input unit IU may receive a data input signal D and a scan input signal SI, select one of the data input signal D and the scan input signal SI, and provide the selected signal as an internal signal IS according to an operation mode. The flip-flop FF may be used to latch the internal signal IS based on a clock signal CLK.

Here, the input unit IU may select the data input signal D in a first operation mode and provide the internal signal IS to the flip-flop FF based on the data input signal D. The input unit IU may select the scan input signal SI in a second operation mode and provide the internal signal IS to the flip-flop FF based on the scan input signal SI. For example, the first operation mode may be a normal operation mode for performing data transfer, and the second operation mode may be a scan test mode for performing a test operation.

According to the embodiment illustrated in FIGS. 4A and 4B, the operation mode may be determined according to a logic level of a scan enable signal SE. For example, the operation mode may be the normal operation mode when the scan enable signal SE is at a first logic level (e.g., a "low" level), and may be the scan test mode when the scan enable signal SE is at a second logic level (e.g., a "high" level).

During the normal operation mode, the input unit IU may provide the data input signal D as the internal signal IS, and the flip-flop FF may perform a normal operation of latching the data input signal D. During the scan test mode, the input unit IU may provide the scan input signal SI as the internal signal IS, and the flip-flop FF may perform a scan operation of latching the scan input signal SI.

Figure 5:
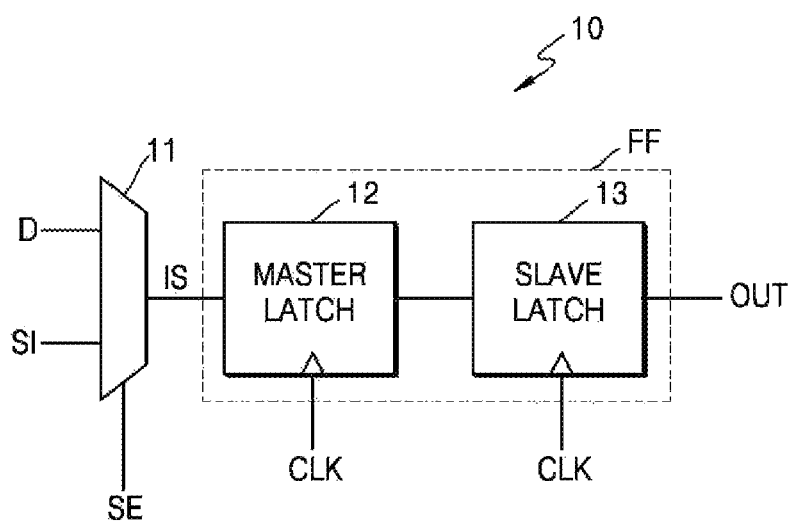
FIG. 5 is a detailed block diagram of a scan flip-flop according to an embodiment.

FIG. 5 is a block diagram illustrating a scan flip-flop 10 according to an embodiment of the inventive concept.

Referring to FIG. 5, the scan flip-flop 10 comprises a multiplexer 11, a master latch 12, and a slave latch 13. The scan flip-flop 10 may be a more specific version of the scan flip-flop SFF of FIGS. 4A and 4B, and may be functionally associated (e.g.,) with a data processor, a scan test circuit or a computing system.

Here, the multiplexer 11 (selector, scan MUX or MUX) may correspond to the input unit IU of FIG. 4A, but is not limited thereto. The input unit IU of FIG. 4A may further include other elements than the multiplexer 11. The multiplexer 11 may select one of a data input signal D and a scan input signal SI according to a scan enable signal SE and provide an internal signal IS to the master latch 12 based on the selected signal.

The master latch 12 and the slave latch 13 may correspond to the flip-flop FF of FIG. 4A, but are limited thereto. The flip-flop FF of FIG. 4A may further include other elements than the master latch 12 and the slave latch 13. The master latch 12 may latch the internal signal IS based on a clock signal CLK. The slave latch 13 may latch an output of the master latch 12 based on the clock signal CLK and provide an output signal OUT.

Figure 6:
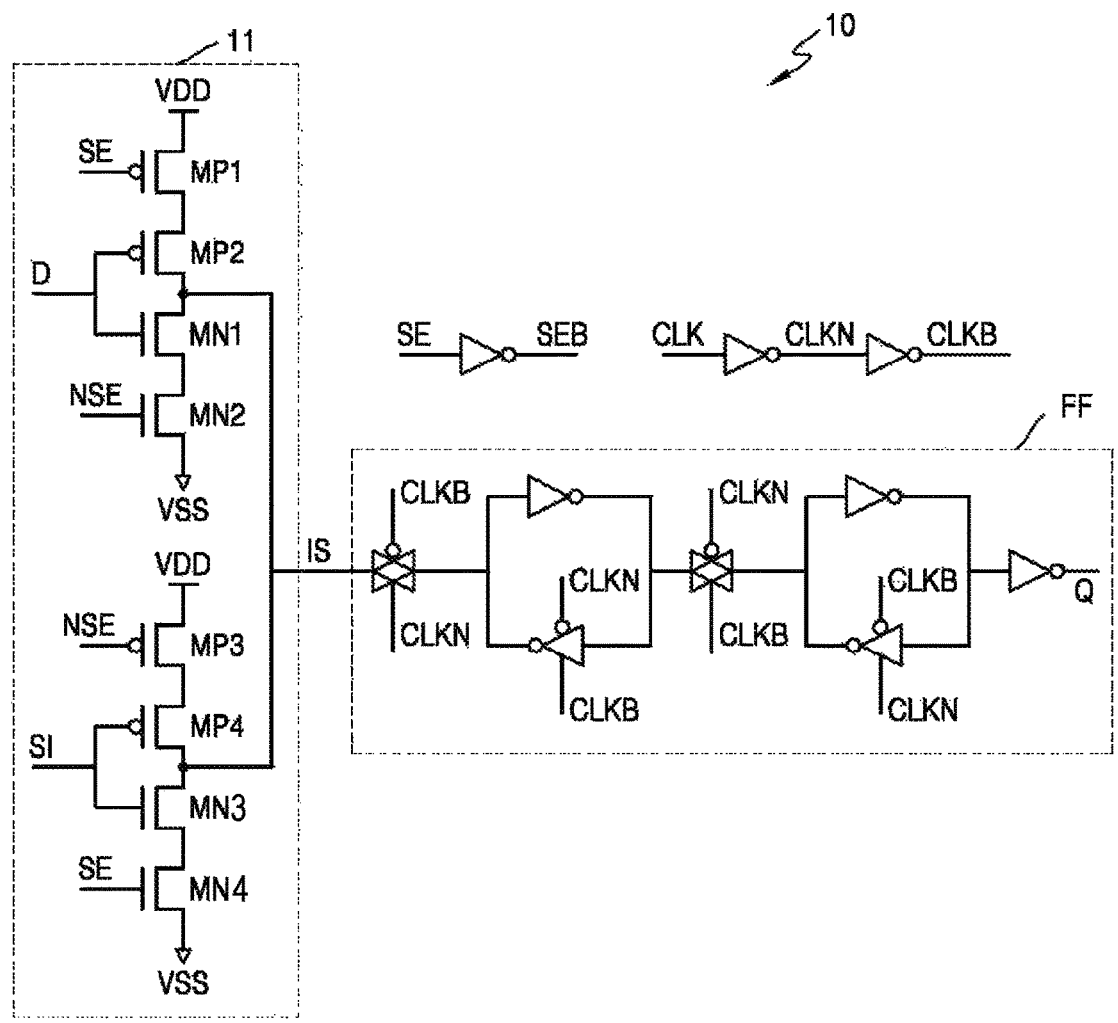
FIG. 6 is a circuit diagram of the scan flip-flop of FIG. 5.

FIG. 6 is a circuit diagram further illustrating in one example the scan flip-flop 10 of FIG. 5.

Referring to FIG. 6, the scan flip-flop 10 includes the multiplexer 11 and flip-flop FF, where the multiplexer 11 include first through fourth PMOS transistors MP1 to MP4 and first through fourth NMOS transistors MN1 to MN4. The multiplexer 11 may have a circuit configuration according to an original schematic based on, for example, the input data received in operation S110 of FIG. 1.

The first PMOS transistor MP1 may have a source connected to a power supply voltage terminal VDD, and a gate to which the scan enable signal SE is applied. The second PMOS transistor MP2 may have a source connected to a drain of the first PMOS transistor MP1, and a gate to which the data input signal D is applied. The first NMOS transistor MN1 may have a drain connected to a drain of the second PMOS transistor MP2, and a gate to which the data input signal D is applied. The second NMOS transistor MN2 may have a drain connected to a source of the first NMOS transistor MN1, a gate to which an inverted scan enable signal NSE is applied, and a source connected to a ground voltage terminal VSS.

The third PMOS transistor MP3 may have a source connected to the power supply voltage terminal VDD, and a gate to which the inverted scan enable signal NSE is applied. The fourth PMOS transistor MP4 may have a source connected to a drain of the third PMOS transistor MP3, and a gate to which the scan input signal SI is applied. The third NMOS transistor MN3 may have a drain connected to a drain of the fourth PMOS transistor MP4, and a gate to which the scan input signal SI is applied. The fourth NMOS transistor MN4 may have a drain connected to a source of the third NMOS transistor MN3, a gate to which the scan enable signal SE is applied, and a source connected to the ground voltage terminal VSS.

The gate of the second PMOS transistor MP2 and the gate of the first NMOS transistor MN1, to which the data input signal D is applied, may be referred to as a data input pin. Also, the gate of the fourth PMOS transistor MP4 and the gate of the third NMOS transistor MN3, to which the scan input signal SI is applied, may be referred to as a scan input pin. An output node of the multiplexer 11 may be commonly connected to the drain of the second PMOS transistor MP2, the drain of the first NMOS transistor MN1, the drain of the fourth PMOS transistor MP4, and the drain of the third NMOS transistor MN3, and the internal signal IS may be transferred to the flip-flop FF through the output node of the multiplexer 11.

Figure 7:
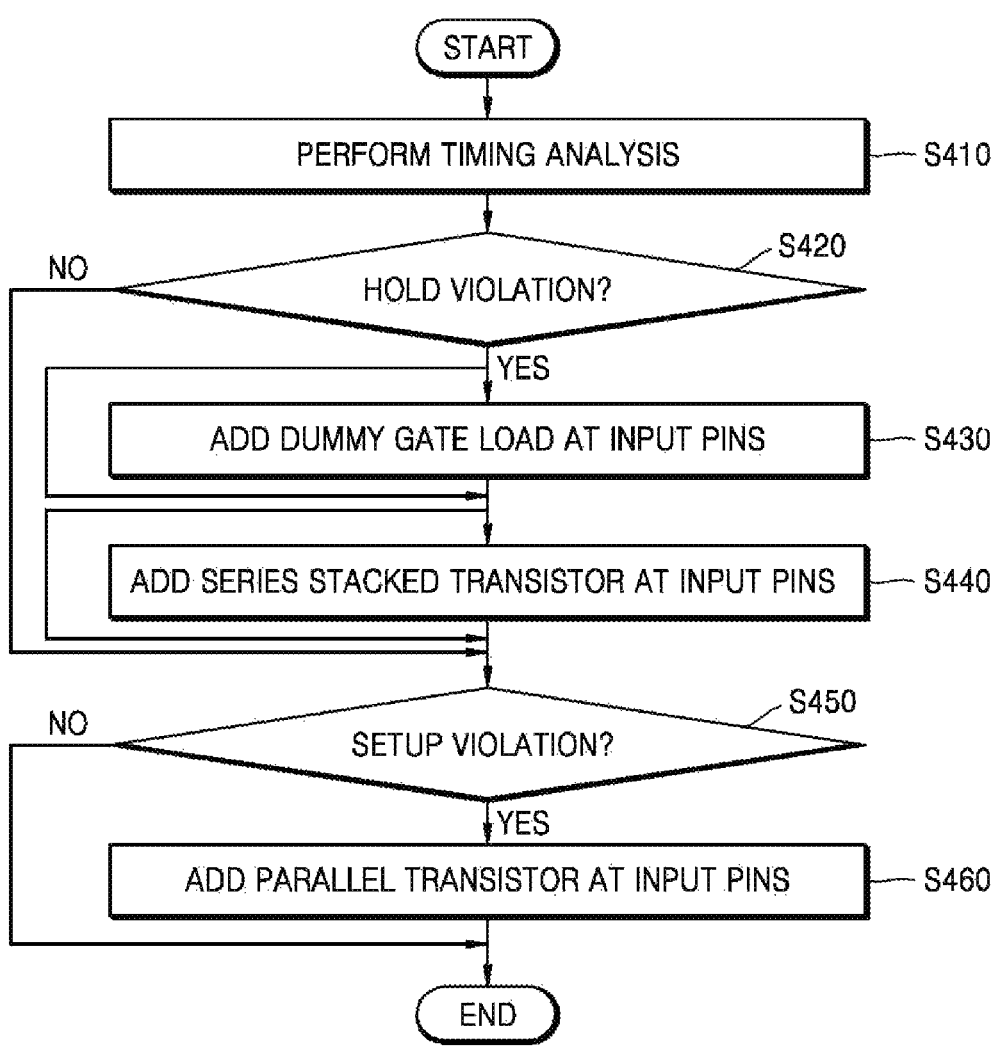
FIG. 7 is a flowchart of a method of designing an integrated circuit, according to an embodiment.

FIG. 7 is a flowchart further illustrating in one example the step of redesigning the initial layout S250 of the design method of FIG. 2 according to an embodiment of the inventive concept. The design method of FIG. 7 may be considered an alternative to the design method previously described with reference to FIG. 3.

In the design method of FIG. 7 a timing analysis is performed using input data, an initial layout and/or a redesigned layout S410. In certain embodiments the timing analysis may be a STA. Whatever the exact nature of the timing analysis, it may be used to determined whether or not a hold time (e.g., a first design constraint) has been violated S420. Upon determining that a hold time has not been violated, the design method of FIG. 7 next determines whether or not a setup time (e.g., a second design constraint) has been violated S450. Hereafter, examples of a hold time violation and a setup time violation will be described with reference to FIGS. 8, 9 and 10.

Figure 8:
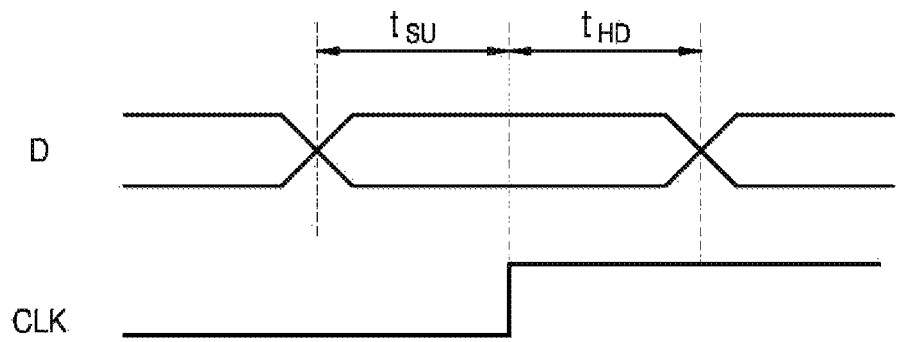
FIG. 8 is a graph showing a setup time and a hold time of a scan flip-flop according to an embodiment.

FIG. 8 is a graph showing a setup time $t_{SU}$ and a hold time $t_{HD}$ for a scan flip-flop according to an embodiment. More particularly, a set of timing relationships between a data input signal D and a clock signal CLK are shown, where the setup time $t_{SU}$ defines a minimum duration during which the data input signal D must be held valid before the clock signal CLK may transition (e.g., low to high or high to low). That is, the setup time $t_{SU}$ corresponds to a minimum duration necessary for determining whether the logic level of the data input signal D is high or low. The hold time $t_{HD}$ defines a minimum duration for which the data input signal D must be held stable after the clock signal CLK transitions. That is, the hold time $t_{HD}$ corresponds to a minimum duration necessary for determining a stable result.

Thus, the setup time $t_{SU}$ and hold time $t_{HD}$ may be respective (first and second) timing requirements of the scan flip-flop, where various timing requirements are understood to be one common class of design constraints for an integrated circuit, such as a scan flip-flop. The term "setup time margin" may be used to define an additional amount of time in relation to (i.e., greater than or equal to) the setup time. Similarly, the term "hold time margin" may used to define an amount of time in relation to (i.e., greater than or equal to) the hold time. Setup time margin(s) and hold time margin(s) are common timing requirements for an integrated circuit such as a scan flip-flop, and may be expressed as one or more design constraint(s).

Thus, in the context of step S420 in the illustrated design method example of FIG. 7, a hold time value acquired during a STA may be compared with a given hold time $t_{TD}$ (first design constraint), such as the one illustrated in FIG. 8. And in the context of step S450 in the illustrated design method of FIG. 7, a setup time acquired during the STA may be compared with a given hold time $t_{SU}$ (second design constraint), such as the one illustrated in FIG. 9.

Figure 9:
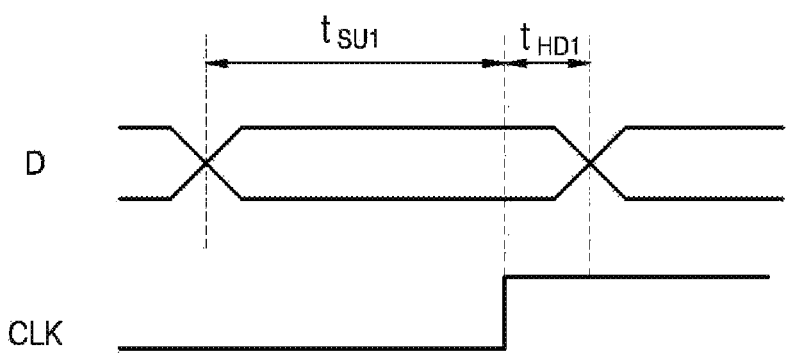
FIG. 9 is a graph showing a hold time violation of a scan flip-flop according to an embodiment.

FIG. 9 is a graph illustrating in relation to FIG. 8 a hold time violation for a scan flip-flop. Referring to FIG. 9, as a result of STA, a first setup time $t_{SU}$ is determined to be greater than the setup time $t_{SU}$ of FIG. 8 and a first hold time $t_{HD1}$ is determined to be less than the hold time $t_{HD}$ of FIG. 8. Under these conditions, since the data input signal D changes before the minimum duration (i.e., the minimum hold time) required after the clock signal CLK is switched, a hold time is violated.

Figure 10:
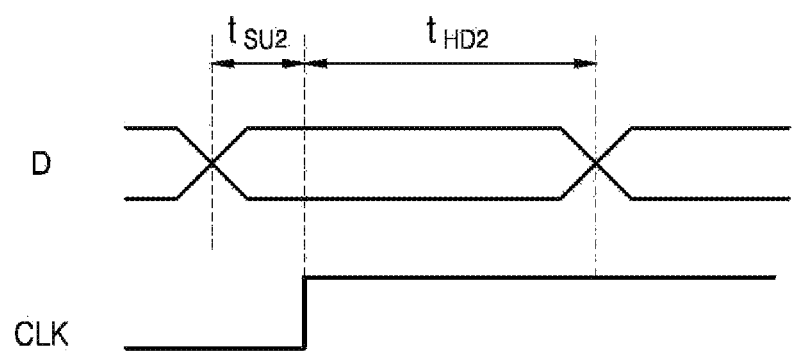
FIG. 10 is a graph showing a setup time violation of a scan flip-flop according to an embodiment.

FIG. 10 is a graph illustrating in relation to FIG. 9 a setup time violation for a scan flip-flop. Referring to FIG. 10, as a result of STA, a second setup time $t_{SU2}$ is determined to be less than the setup time $t_{SU}$ of FIG. 8 and a second hold time $t_{HD2}$ is determined to be greater than the hold time $t_{HD}$ of FIG. 8. Under these conditions, since the data input signal D changes before the minimum duration of time (i.e., the minimum setup time) required before the clock signal CLK is switched, a setup time is violated.

Referring back to FIG. 7, upon determining that a hold time has been violated, a related hold time margin may be increased by delaying the data input signal D along the corresponding data input signal path. Alternately or additionally, a hold time margin on a scan input path may be increased by delaying the scan input signal SI along the corresponding scan input path. One or both of these approaches may be accomplished, for example, by executing the operations described hereafter in relation to method steps S430 and/or S440.

In operation S430, a dummy gate load may be added to an initial layout proximate one or more input pins of the integrated circuit. For example, the input pins may be the data input pin of FIG. 6 to which the data input signal D is applied and the scan input pin of FIG. 6 to which the scan input signal SI is applied. The term "dummy gate load" refers to an electrical load corresponding to a dummy gate. Since the dummy gate has a resistance component, the addition of the dummy gate increases the load on the input pins. Accordingly, the data input signal D and the scan input signal SI may be delayed on the input paths, thus increasing the corresponding hold time margin. This is just one example of hold time margin adjustment that may be accomplished by embodiments of the inventive concept.

In operation S440, a series stacked transistor may be added to an initial layout proximate one or more input pins. For example, the input pins may be the data input pin of FIG. 6 to which the data input signal D is applied and the scan input pin to which the scan input signal SI is applied. According to an embodiment, the series stacked transistor may be added between the second PMOS transistor MP2 and the first NMOS transistor MN1 or between the first PMOS transistor MP1 and the second PMOS transistor MP2. According to another embodiment, the series stacked transistor may be added between the fourth PMOS transistor MP4 and the third NMOS transistor MN3, or between the third NMOS transistor MN3 and the fourth NMOS transistor MN4. Since the data input path and the scan input path are temporally extended in this manner, the data input signal D and the scan input signal SI may be delayed in a controlled fashion to selectively increase the hold time margin. Again, this is just one example of hold time margin adjustment that may be accomplished by embodiments of the inventive concept.

As previously noted, in operation S450, a determination is made as to whether or not a setup time has been violated. Upon determining that a setup time has been violated in the working example of FIG. 8, the data input signal D and the scan input signal SI may be advanced, thus increasing the setup time margin.

According to one embodiment, the setup time margin may be increased on the data input path by advancing the data input signal D. Alternately or additionally, the setup time margin may be increased on the scan input signal SI by advancing the scan input signal SI on the scan input path.

In operation S460, a parallel stacked transistor may be added to the initial layout proximate one or more input pins. For example, the input pins may be the data input pin of FIG. 6 to which the data input signal D is applied and the scan input pin of FIG. 6 to which the scan input signal SI is applied. According to an embodiment, the parallel stacked transistor may be added at the second PMOS transistor MP2. According to another embodiment, the parallel stacked transistor may be added at the third NMOS transistor MN3. Therefore, the width of an input transistor may be increased on the data input path and the scan input path, such that the data input signal D and/or scan input signal SI are transferred at a relatively higher speed.

Figure 12:
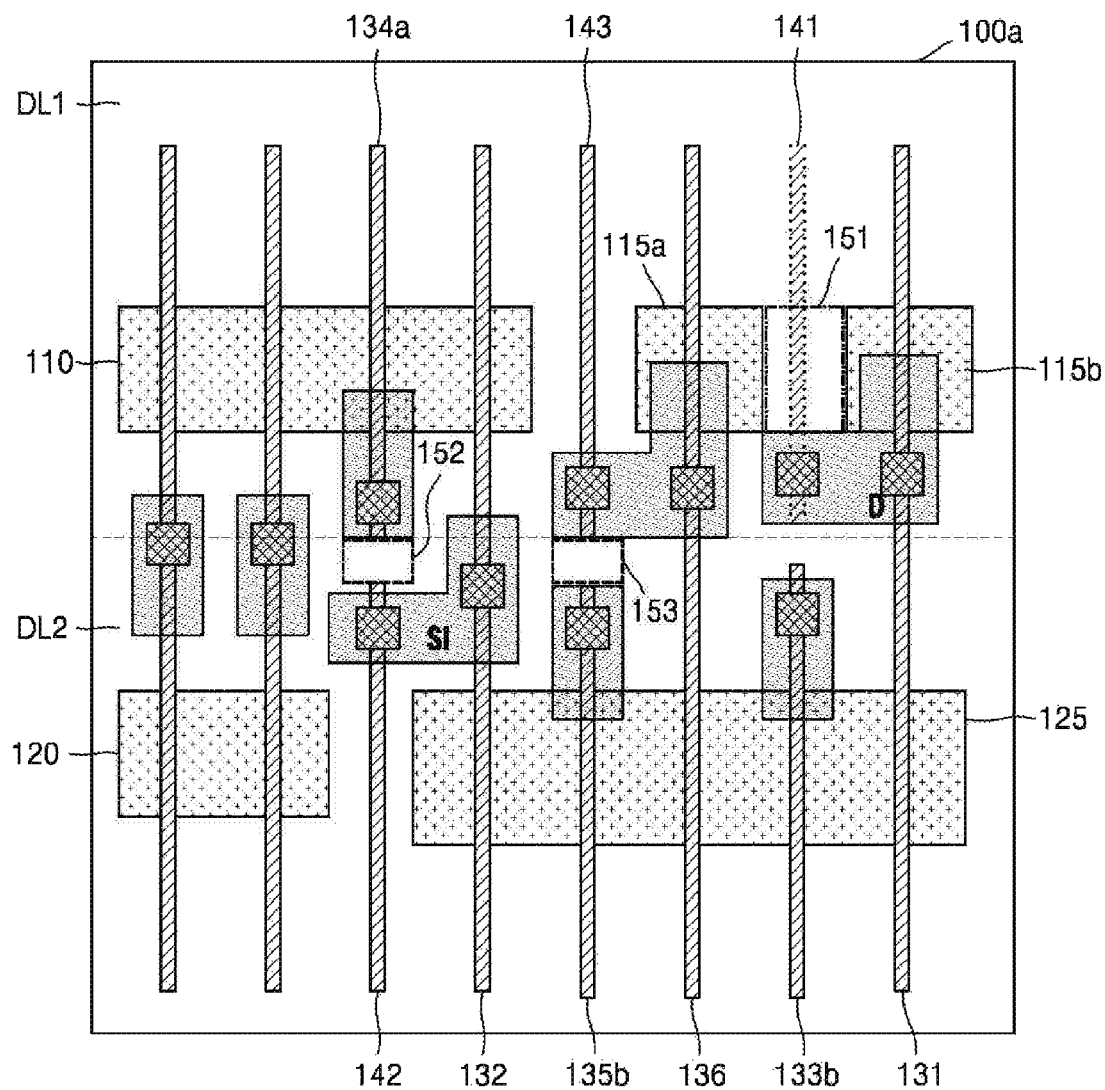
FIG. 12 illustrates an example of a layout in which the scan flip-flop of FIG. 11 is redesigned when a hold time violation has occurred, according to an embodiment.
Figure 13:
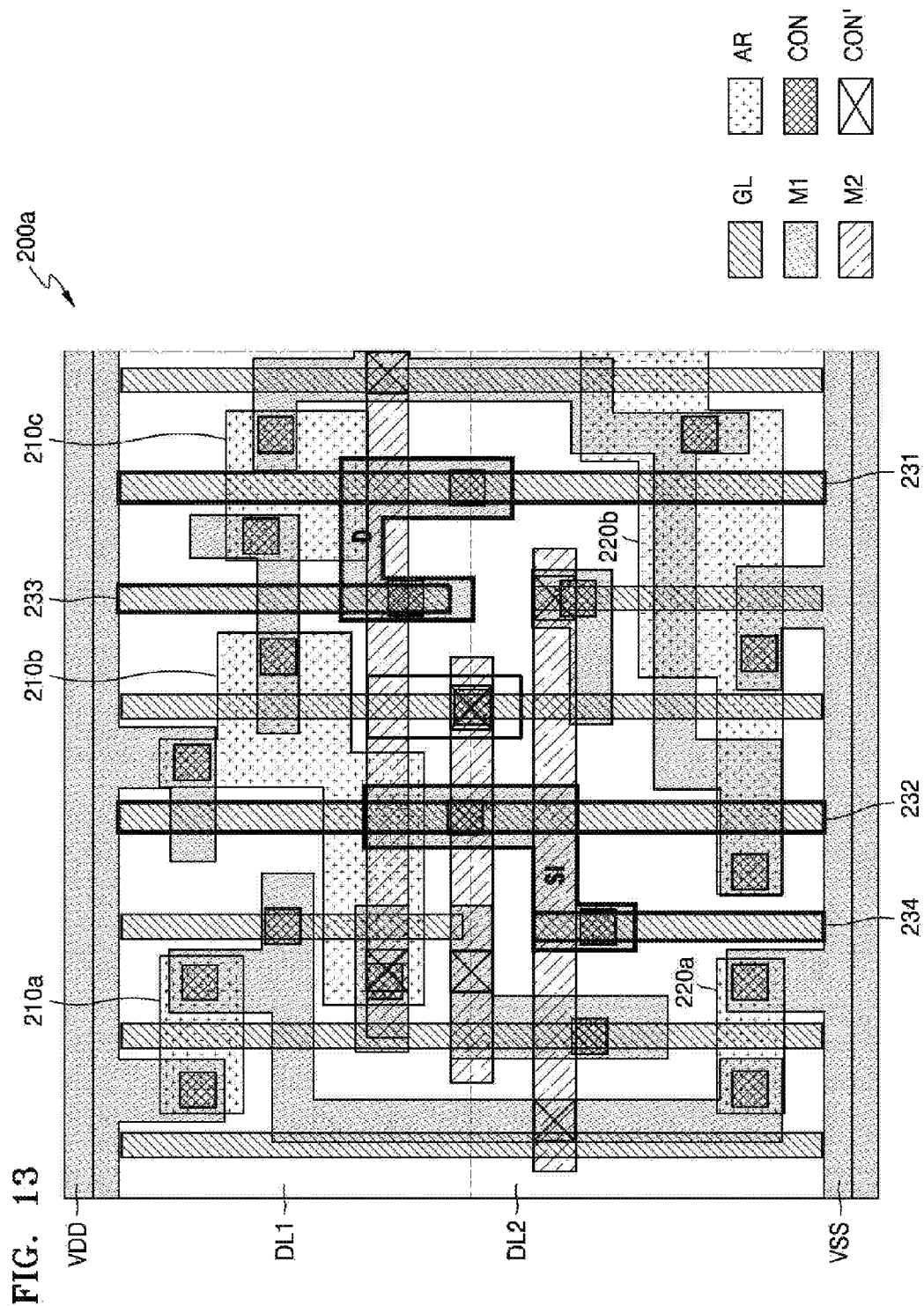
FIG. 13 illustrates another example of a layout in which the scan flip-flop of FIG. 11 is redesigned when a hold time violation has occurred, according to an embodiment.
Figure 17:
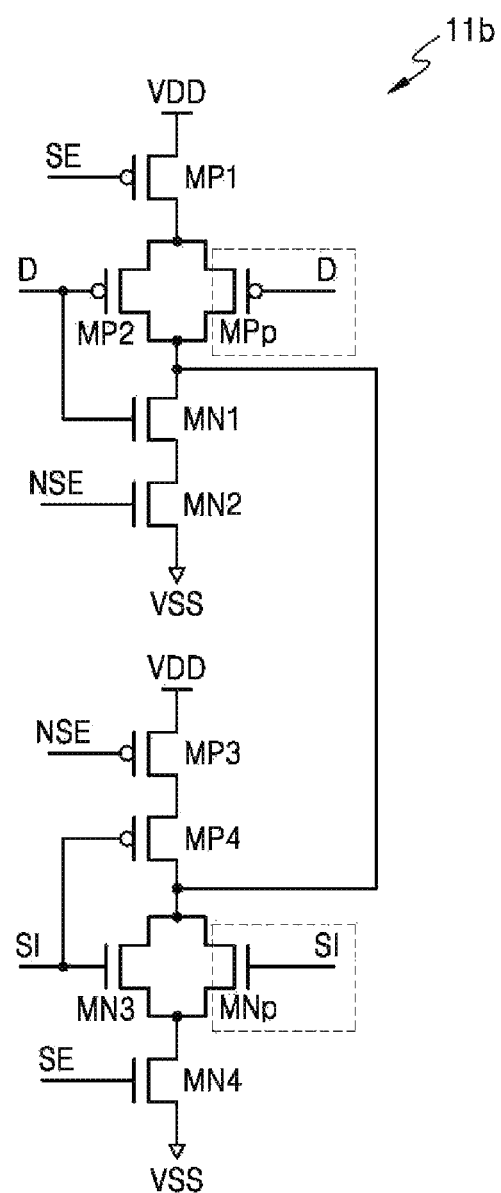
FIG. 17 illustrates a multiplexer that is provided by redesigning a multiplexer included in the scan flip-flop of FIG. 6 when a setup time violation has occurred, according to an embodiment.
Figure 18:
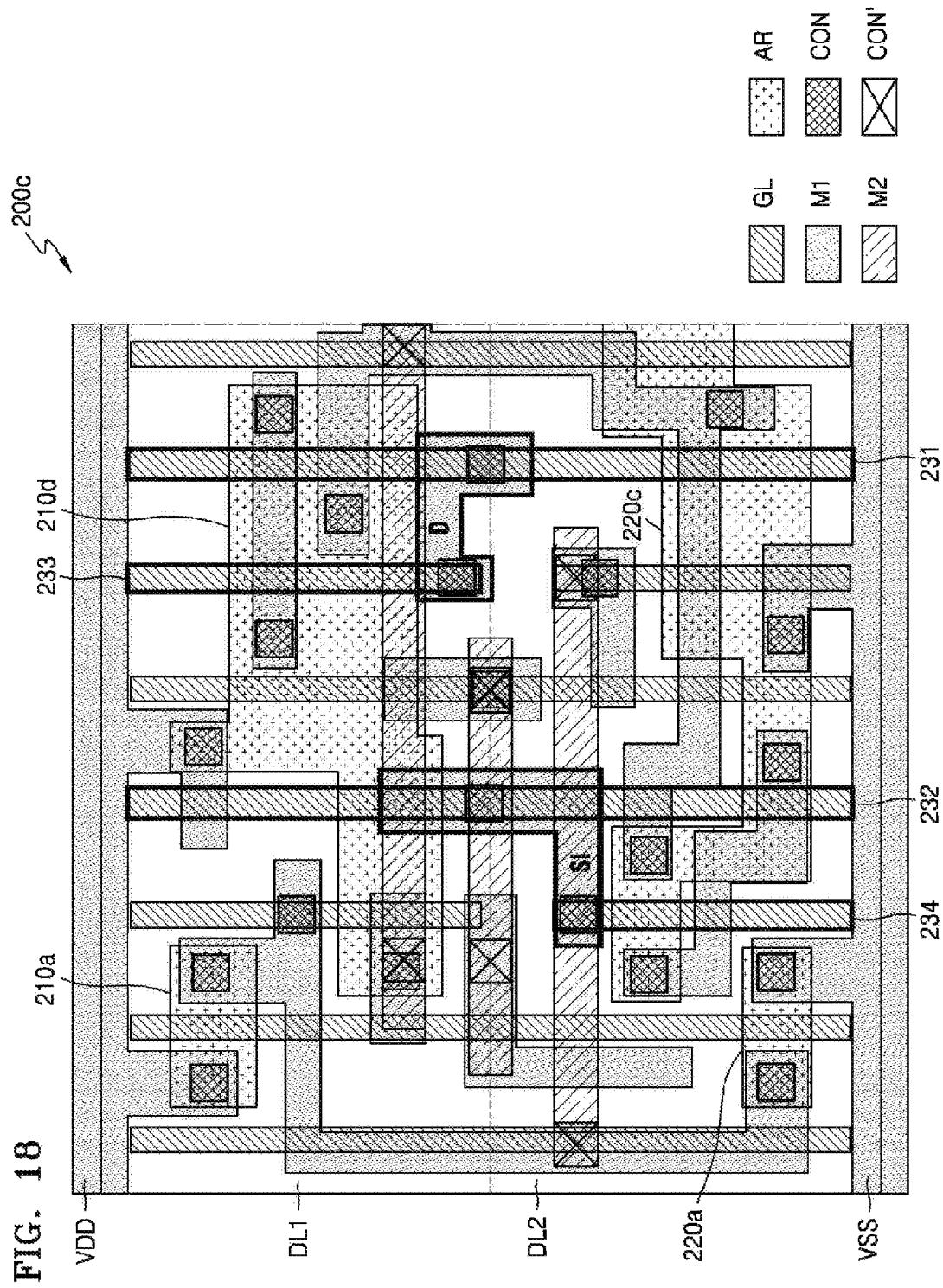
FIG. 18 illustrates an example of a layout in which the scan flip-flop of FIG. 11 is redesigned using the multiplexer of FIG. 17.

With the foregoing embodiments and teachings in mind, it is hereafter assumed that an integrated circuit being designed and manufactured includes a scan flip-flop. The design method described in relation to FIG. 7 is further assumed in the description of FIGS. 11 through 18, inclusive, that follows. Thus, FIG. 11 is assumed to be an initial (e.g., original) layout, FIGS. 12 and 13 illustrate an implementation example of operation S430 of FIG. 7, FIGS. 14, 15 and 16 illustrate an implementation example of operation S440 of FIG. 7, and FIGS. 17 and 18 illustrate an implementation example of operation S460 of FIG. 7.

Figure 11:
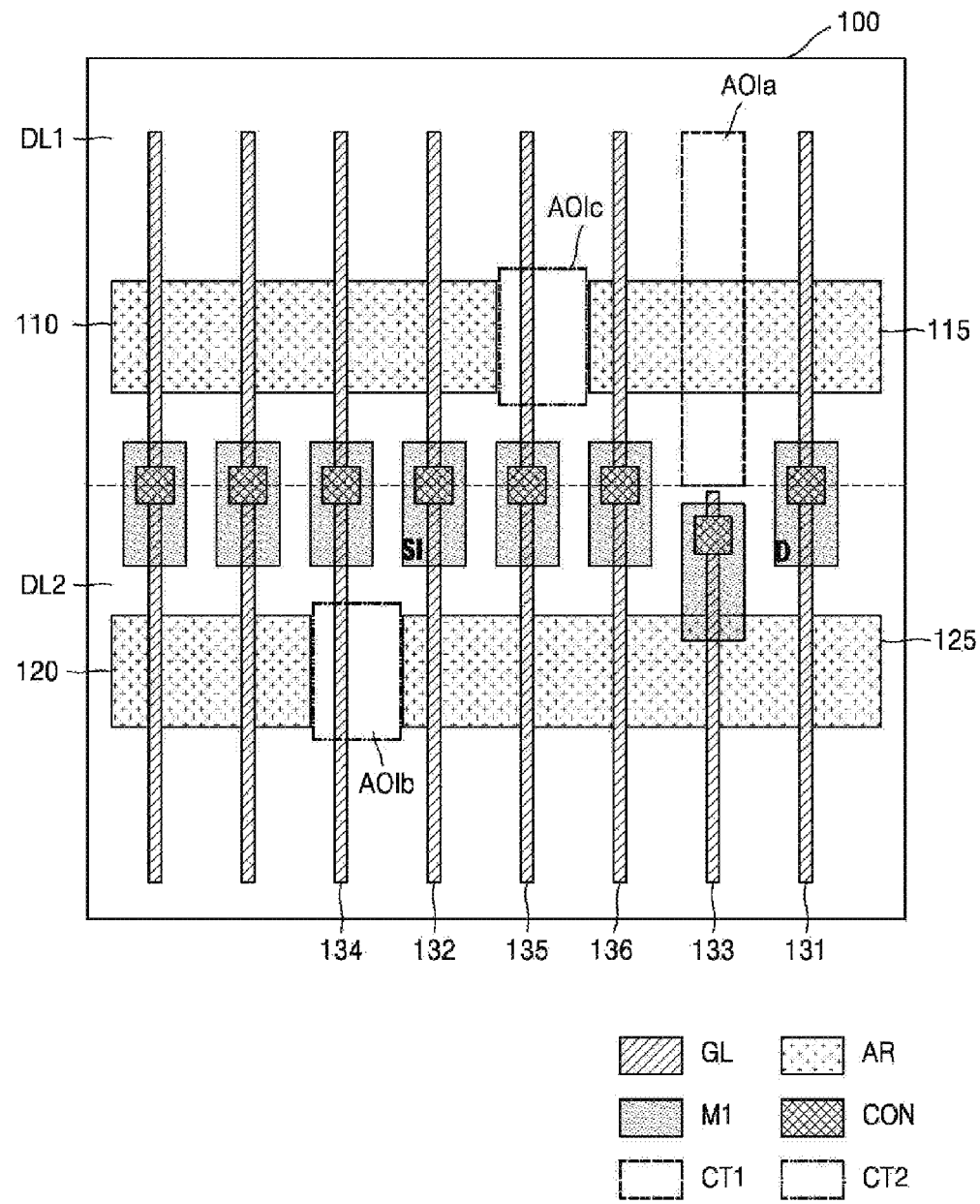
FIG. 11 illustrates an example of a layout of a scan flip-flop, according to an embodiment.

Referring to FIG. 11, the initial layout 100 is accepted by the design method of FIG. 7 as an input to a simulation (e.g., timing analysis). If the timing analysis determines that no timing constraint (e.g., a hold time or a setup time) has been violated, the design method is concluded as no redesign is needed, and the initial layout is deemed to be suitable as an input to the manufacturing process.

The initial layout 100 of FIG. 11 describes a region corresponding to, for example, the multiplexer 11 in a standard cell corresponding to the scan flip-flop 10 of FIG. 6. The initial layout 100 includes active regions AR, gate lines GL, first contacts CON, and first metal lines M1. The initial layout 100 may further include a first cutting area CT1 and a second cutting area CT2, where the first cutting area CT1 may be a marking layer for cutting a portion of the gate line GL, and the second cutting area CT2 may be a marking layer for cutting a portion of the active region AR.

The active regions AR may include first active regions 110 and 115 and second active regions 120 and 125, and extend in a first direction (e.g., an X direction in the illustrated example). The first active regions 110 and 115 may be disposed in a first definition layer DL1 and the second active regions 120 and 125 may be disposed in a second definition layer DL2. In one embodiment, the first definition layer DL1 may be an N-well region, that is, a PMOS definition layer in which PMOS transistors are formed, and the second definition layer DL2 may be a P-well region, that is, an NMOS definition layer in which NMOS transistors are formed. The first active regions 110 and 115 may be a diffusion layer formed by doping a first-conductivity-type impurity, and the second active regions 120 and 125 may be a diffusion layer formed by doping a second-conductivity-type impurity, where the first conductivity type is different from the second conductivity type.

The gate lines GL extend in a second direction (e.g., a Y direction in the illustrated example) substantially perpendicular to the first direction and may be arranged in parallel. The gate lines GL may correspond to gate electrodes of a semiconductor device. The gate electrodes may include a certain material having electrical conductivity and may include, for example, polysilicon, a metal, or a metal alloy. However, the present embodiment is not limited thereto, and the gate lines GL may correspond to a trace or the like having certain conductivity.

In the illustrated embodiment of FIG. 11, the gate lines GL may include first to sixth gate lines 131 to 136. The first gate line 131 may correspond to a first input pin, for example, the data input pin of FIG. 6 to which the data input signal D is applied, that is, the gates of the second PMOS transistor MP2 and the first NMOS transistor MN1. The second gate line 132 may correspond to a second input pin, for example, the scan input pin of FIG. 6 to which the scan input signal SI is applied, that is, the gates of the fourth PMOS transistor MP4 and the third NMOS transistor MN3. The third gate line 133 may be disposed adjacent to the left side of the first gate line 131, and the fourth and fifth gate lines 134 and 135 may be respectively disposed adjacent to both sides of the second gate line 132. The sixth gate line 136 may be disposed between the third gate line 133 and the fifth gate line 135.

The first contacts CON are respectively disposed on the gate lines GL, and the first metal lines M1 are respectively disposed on the first contacts CON. Therefore, signals (e.g., voltage signals) applied through the first metal lines M1 may be respectively transferred to the gate lines GL through the first contacts CON.

A first cutting area CT1 may be disposed at the third gate line 133 on the first definition layer DL1. An area corresponding to the first cutting area CT1 may be referred to as a first area of interest AOIa. According to an embodiment, the first active regions 110 and 115 may be formed by disposing the second cutting area CT2 in one active region extending in the first direction on the first definition layer DL1, and the second active regions 120 and 125 may be formed by disposing the second cutting area CT2 in one active region extending in the first direction on the second definition layer DL2. In this case, an area corresponding to the second cutting area CT2 on the second definition layer DL2 may be referred to as a second area of interest AOIb, and an area corresponding to the second cutting area CT2 on the first definition layer DL1 may be referred to as a third area of interest AOIc.

In the illustrated embodiment, the step of redesigning (or reconfiguring) the initial layout may include the addition of new gate lines and/or new active regions to the first, second and/or third areas of interest AOIa to AOIc. Since redesign is performed on some regions included in the initial layout 100 (e.g., first, second and third areas of interest AOIa to AOIc), the size of the resulting redesign layout need not change in relation to the size of the initial layout, despite the redesign.

FIG. 12 illustrates a redesign layout 100a in which the initial layout od FIG. 11 describing the scan flip-flop has been changed upon a determination made by running a timing analysis that a hold time has been violated.

Referring to FIG. 12, the redesign layout 100a may be created from the initial layout by adding a dummy gate load at the input pins using operation S430 of FIG. 7. Thus, a cutting area 151 may be disposed in a region adjacent to the first gate line 131 in the first active region 115 of FIG. 11. Therefore, the first active region 115 of FIG. 11 may be cut or separated into a first partial active region 115a and a second partial active region 115b, and a dummy region may be formed between the first partial active region 115a and the second partial active region 115b.

A new gate line 141 may be added in the first area of interest AOIa of FIG. 11 (i.e., between the first partial active region 115a and the second partial active region 115b). In addition, a first contact CON may be disposed on the new gate line 141, and a first metal line M1 may be redesigned, so as to connect the new gate line 141 to the first gate line 131. In this case, since the new gate line 141 is disposed in the dummy region, the new gate line 141 may correspond to a first dummy gate, and the data input signal D applied to the first gate line 131 corresponding to the first input pin is delayed, thereby increasing the hold time margin on the data input path.

Continuing with the illustrated embodiment of FIG. 12, a cutting area 152 may be disposed in a central region of the fourth gate line 134 of FIG. 11. Accordingly, the fourth gate line 134 of FIG. 11 may be cut or separated into first and second partial gate lines 134a and 142. Also, the first contact CON may be disposed on the second partial gate line 142, and the first metal line M1 may be redesigned so as to connect the second partial gate line 142 to the second gate line 132.

Since the first partial gate line 134a is disposed on the first active region 110, the first partial gate line 134a may correspond to a real gate to thereby constitute a transistor. On the other hand, since the second partial gate line 142 is not disposed on the active region, the second partial gate line 142 may correspond to a second dummy gate. Therefore, the scan input signal SI applied to the second gate line 132 corresponding to the second input pin is delayed, thereby increasing the hold time margin on the scan input path.

A cutting area 153 may be disposed in the central region of the fifth gate line 135 of FIG. 11. Accordingly, the fifth gate line 135 of FIG. 11 may be cut or separated into third and fourth partial gate lines 143 and 135b. Also, the first contact CON may be disposed on the third partial gate line 143, and the first metal line M1 may be redesigned so as to connect the third partial gate line 143 to the sixth gate line 136.

Since the fourth partial gate line 135b is disposed on the second active region 125, the fourth partial gate line 135b may correspond to a real gate to thereby constitute a transistor. On the other hand, since the third partial gate line 143 is not disposed on the active region, the third partial gate line 143 may correspond to a third dummy gate. Therefore, the data input signal D applied to the first gate line 131 corresponding to the first input pin is delayed, thereby increasing the hold time margin on the data input path.

In the illustrated embodiment of FIG. 12, the redesign layout 100a includes first, second and third dummy gates (e.g., the new gate line 141, second partial gate line 142, and third partial gate line 143). In other embodiments, the redesign layout 100a may created to include only one dummy gate selected from among the first, second and third dummy gates. Alternately, the redesign layout 100a may be created to include two dummy gates selected from among the first, second and third dummy gates. Alternately, the redesign layout 100a may be created to include four or more dummy gates. Thus, it will be understood that a designer may adjust the number of added dummy gates within a redesign layout according to the nature and degree of the hold time violation.

FIG. 13 illustrates another redesign layout 200a that may be created from the initial layout of the scan flip-flop shown in FIG. 11. Here again, a hold time violation is assumed, and the redesign layout 200a is created by adding a dummy gate load at the input pins according to operation S430 of FIG. 7.

The redesign layout 200a of FIG. 13 includes active regions AR, gate lines GL, first and second metal lines M1 and M2, first and second contacts CON and CON', a power supply voltage terminal VDD, and a ground voltage terminal VSS. The active regions AR may include first active regions 210a, 210b, and 210c disposed in a first definition layer DL1, and second active regions 220a and 220b disposed in a second definition layer DL2.

The gate lines GL may include first through fourth gate lines 231 to 234. The first gate line 231 may correspond to the data input pin of FIG. 6 to which the data input signal D is applied. The first gate line 231 may correspond to the gates of the second PMOS transistor MP2 and the first NMOS transistor MN1. The second gate line 231 may correspond to the scan input pin of FIG. 6 to which the scan input signal SI is applied. The second gate line 231 may correspond to the gates of the fourth PMOS transistor MP4 and the third NMOS transistor MN3.

The third gate line 233 may correspond to a dummy gate, and therefore, the data input signal D applied through the first and third gate lines 231 and 233 may be delayed. Similarly, the fourth gate line 234 may correspond to a dummy gate, and therefore, the scan input signal SI applied through the second and fourth gate lines 232 and 234 may be delayed.

Figure 14:
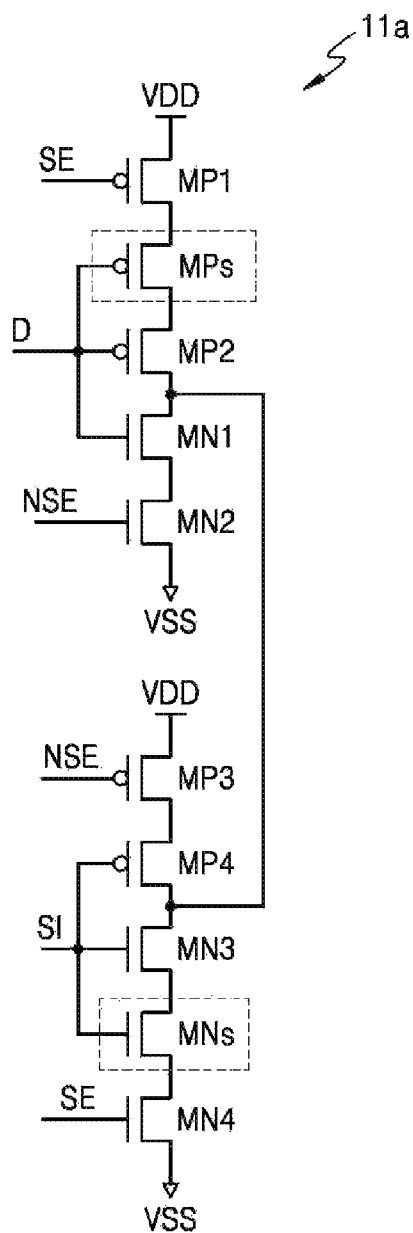
FIG. 14 illustrates a multiplexer that is provided by redesigning a multiplexer included in the scan flip-flop of FIG. 6 when a hold time violation has occurred, according to an embodiment.

FIG. 14 is a circuit diagram for a multiplexer 11a that may be obtained by redesigning the initial layout of the multiplexer 11 included in the scan flip-flop 10 of FIG. 6 upon determining that a hold time violation has occurred.

Referring to FIG. 14, the multiplexer 11a may further include a series stacked PMOS transistor MPs and a series stacked NMOS transistor MNs, as compared to the multiplexer 11 of FIG. 6.

The series stacked PMOS transistor MPs may be connected in series with the second PMOS transistor MP2. The series stacked PMOS transistor MPs may have a source connected to the drain of the first PMOS transistor MP1, a gate to which the data input signal D is applied, and a drain connected to the source of the second PMOS transistor MP2. Since the data input path is effectively extended due to the addition of the series stacked PMOS transistor MPs, the data input signal D is delayed, thereby increasing the hold time margin on the data input path. The series stacked PMOS transistor MPs may be exchanged in position with the second PMOS transistor MP2.

The series stacked NMOS transistor MNs may be connected in series with the third NMOS transistor MN3. The series stacked NMOS transistor MNs may have a drain connected to a source of the third NMOS transistor MN3, a gate to which the scan input signal SI is applied, and a source connected to the drain of the fourth NMOS transistor MN4. Since the scan input path is effectively extended due to the addition of the series stacked NMOS transistor MNs, the scan input signal SI is delayed, thereby increasing the hold time margin on the scan input path. The series stacked NMOS transistor MNs may be exchanged in position with the third NMOS transistor MN3.

FIG. 15 is another redesign layout 100b for the scan flip-flop of FIG. 11 and may be obtained by incorporating the multiplexer 11a of FIG. 14.

Referring to FIG. 15, the redesign layout 100b may be created by adding a series stacked transistor at the input pins according to operation S440 of FIG. 7.

Here, a new gate line 160 is added to the first area of interest AOIa of FIG. 11 (i.e., between the first gate line 131 and the sixth gate line 136 in the first definition layer DL1). The first contact CON may be disposed on the new gate line 160, and the first metal line M1 may be redesigned so as to connect the new gate line 160 to the first gate line 131.

Since the new gate line 160 is disposed on the first active region 115, the new gate line 160 may correspond to a real gate to thereby constitute a transistor. The new gate line 160 may constitute the series stacked PMOS transistor MPs of FIG. 14. Therefore, the data input signal D applied to the first gate line 131 corresponding to the first input pin is delayed, thereby increasing the hold time margin on the data input path.

A second cutting area 152 may be disposed in the central region of the fourth gate line 134 of FIG. 11. Accordingly, the fourth gate line 134 of FIG. 11 may be cut or separated into first and second partial gate lines 134a and 134b. The first contact CON may be disposed on the second partial gate line 134b, and the first metal line M1 may be redesigned so as to connect the second partial gate line 134b to the second gate line 132.

In addition, a first new active region 125a may be added under the second partial gate line 134b. Since the second partial gate line 134b is disposed on the first new active region 125a, the second partial gate line 134b may correspond to a real gate to thereby constitute a transistor. The second partial gate line 134b may constitute the series stacked NMOS transistor MNs of FIG. 14. Therefore, the scan input signal SI applied to the second gate line 132 corresponding to the second input pin is delayed, thereby increasing the hold time margin on the scan input path.

A second cutting area 153 may be disposed in the central region of the fifth gate line 135 of FIG. 11. Accordingly, the fifth gate line 135 of FIG. 11 may be separated into third and fourth partial gate lines 135a and 135b. The first contact CON may be disposed on the third partial gate line 135a, and the first metal line M1 may be redesigned so as to connect the third partial gate line 135a to the sixth gate line 136.

In addition, a second new active region 115c may be added under the third partial gate line 135a. Since the third partial gate line 135a is disposed on the second new active region 115c, the third partial gate line 135a may correspond to a real gate to thereby constitute a transistor. Therefore, the data input signal D applied to the first gate line 131 corresponding to the first input pin is further delayed, thereby further increasing the hold time margin on the data input path.

According to the illustrated embodiment of FIG. 15, the redesign layout 100b may include a new gate electrode 160, and first and second active regions 125a and 115c. However, the present embodiment is not limited thereto. In some embodiments, the initial layout 100b may be redesigned to include only one active region selected from among the first and second active regions 125a and 115c. In some embodiments, the initial layout 100b may be redesigned to include only one selected from among the new gate electrode 160 and the first active region 125a. In some embodiments, the initial layout 100b may be redesigned to include only one selected from among the new gate electrode 160 and the second active region 115c. As such, it will be understood that a designer may adjust the number of patterns to be added to a redesign layout according to the nature and degree of timing constraint violation(s).

Figure 16:
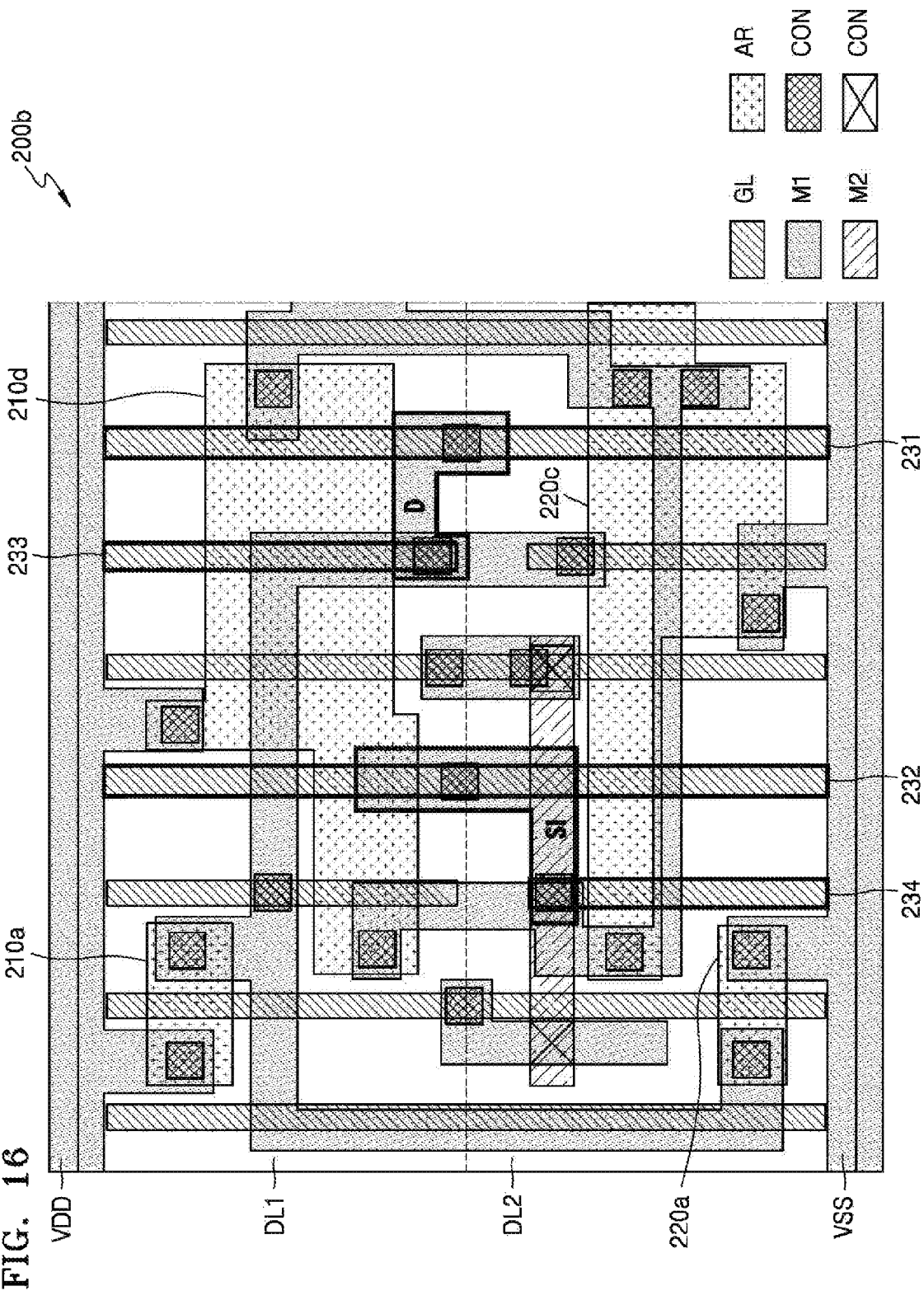
FIG. 16 illustrates another example of a layout in which the scan flip-flop of FIG. 11 is redesigned using the multiplexer of FIG. 14.

FIG. 16 illustrates still another redesign layout 200b in which the scan flip-flop of FIG. 11 incorporates the multiplexer 11a of FIG. 14.

Referring to FIG. 16, the redesign layout 200b may be created by adding a series stacked transistor at the input pins according to operation S440 of FIG. 7.

The redesign layout 200b may include active regions AR, gate lines GL, first and second metal lines M1 and M2, first and second contacts CON and CON', a power supply voltage terminal VDD, and a ground voltage terminal VSS. The first contact CON may be disposed on the gate lines GL, and the first metal line M1 may be disposed on the first contact CON. Therefore, a signal applied to the first metal line M1 may be transferred to the gate lines GL through the first contact CON. The second contact CON' may be disposed on the first metal line M1 and the second metal line M2 may be disposed on the second contact CON. Therefore, a signal applied to the second metal line M2 may be transferred to the first metal line M1 through the second contact CON'.

The active regions AR may include first active regions 210a and 210d disposed in a first definition layer DL1, and second active regions 220a and 220c disposed in a second definition layer DL2. The gate lines GL may include first to fourth gate lines 231 to 234. The first gate line 231 may correspond to the data input pin of FIG. 14 to which the data input signal D is applied. The first gate line 231 may correspond to the gates of the second PMOS transistor MP2 and the first NMOS transistor MN1. The second gate line 231 may correspond to the scan input pin of FIG. 14 to which the scan input signal SI is applied. The second gate line 231 may correspond to the gates of the fourth PMOS transistor MP4 and the third NMOS transistor MN3.

The third gate line 233 may correspond to the data input pin of FIG. 14 to which the data input signal D is applied. The third gate line 233 may correspond to the gate of the series stacked PMOS transistor MPs. Therefore, the data input signal D applied through the first and third gate lines 231 and 233 is delayed. The fourth gate line 234 may correspond to the scan input pin of FIG. 14 to which the scan input signal SI is applied. The fourth gate line 234 may correspond to the gate of the series stacked NMOS transistor MNs. Therefore, the scan input signal SI applied through the second and fourth gate lines 232 and 234 is delayed.

FIG. 17 is a circuit diagram illustrating a multiplexer 11b that may replace the multiplexer 11 included in the scan flip-flop 10 of FIG. 6 upon determining that a setup time violation has occurred.

Referring to FIG. 17, the multiplexer 11b may further include a parallel stacked PMOS transistor MPp and a parallel stacked NMOS transistor MNp, as compared to the multiplexer 11 of FIG. 6.

The parallel stacked PMOS transistor MPp may be connected in parallel with the second PMOS transistor MP2. The parallel stacked PMOS transistor MPp may have a source connected to the drain of the first PMOS transistor MP1 and the source of the second PMOS transistor MP2, a gate to which the data input signal D is applied, and a drain connected to the drain of the first NMOS transistor MN1 and the drain of the second PMOS transistor MP2. The width of the PMOS transistor, to which the data input signal D is applied, may be effectively extended due to the addition of the parallel stacked PMOS transistor MPp, thereby increasing the transfer speed of the data input signal D. Accordingly, the data input signal D is advanced, thereby increasing the setup time margin.

The parallel stacked NMOS transistor MNp may be connected in parallel with the third NMOS transistor MN3. The parallel stacked NMOS transistor MNp may include a drain connected to the drain of the fourth PMOS transistor MP4 and the drain of the third NMOS transistor MN3, a gate to which the scan input signal SI is applied, and a source connected to the drain of the fourth NMOS transistor MN4 and the source of the third NMOS transistor MN3. The width of the NMOS transistor, to which the scan input signal SI is applied, may be effectively extended due to the addition of the parallel stacked NMOS transistor MNp, thereby increasing the transfer speed of the scan input signal SI. Accordingly, the scan input signal SI is advanced, thereby increasing the setup time margin.

A redesign layout describing the scan flip-flop incorporating the multiplexer 11b of FIG. 17 may otherwise be substantially the same as the layout of FIG. 15. That is, similar to the redesign layout 100b of FIG. 15, a redesign layout according to FIG. 17 may include first active regions 110a and 115, second active regions 120a and 125, first and second new active regions 125a and 115c, first, second, third, and sixth gate lines 131, 132, 133, 136, first to fourth partial gate lines 134a, 134b, 135a, and 135b, a new gate line 160, a first contact CON, and a first metal line M1.

The redesign layout 100b of FIG. 15 may further include the series stacked PMOS transistor and the series stacked NMOS transistor, as compared to the initial layout 100 of FIG. 11. The redesign layout according to FIG. 17 may further include the parallel stacked PMOS transistor and the parallel stacked NMOS transistor, as compared to the initial layout 100 of FIG. 11. In this case, the same data input signal D may be applied to the gates of the series stacked PMOS transistor and the parallel stacked PMOS transistor, and the sources and drains of the series stacked PMOS transistor and the parallel stacked PMOS transistor may have different connections. In addition, the same scan input signal SI may be applied to the gates of the series stacked NMOS transistor and the parallel stacked NMOS transistor, and the sources and drains of the series stacked NMOS transistor and the parallel stacked NMOS transistor may have different connections. Therefore, the redesign layout 100b of FIG. 15 may be substantially the same as a redesign layout for FIG. 17, except for the placement of the second contact on the first metal line M1 and the second metal line M2 on the second contact.

FIG. 18 illustrates still another redesign layout 200c in which the scan flip-flop 100 of FIG. 11 is redesigned to incorporate the multiplexer 11b of FIG. 17.

Referring to FIG. 18, the redesign layout 200c may be created by adding the parallel stacked transistor at the input pins according to operation S460 of FIG. 7. The redesign layout 200c may include active regions AR, gate lines GL, first and second metal lines M1 and M2, first and second contacts CON and CON', a power supply voltage terminal VDD, and a ground voltage terminal VSS. The first contact CON may be disposed on the gate lines GL, and the first metal line M1 may be disposed on the first contact CON. Therefore, a signal applied to the first metal line M1 may be transferred to the gate lines GL through the first contact CON. The second contact CON' may be disposed on the first metal line M1 and the second metal line M2 may be disposed on the second contact CON'. Therefore, a signal applied to the second metal line M2 may be transferred to the first metal line M1 through the second contact CON'.

The active regions AR may include first active regions 210a and 210d disposed in a first definition layer DL1, and second active regions 220a and 220c disposed in a second definition layer DL2. The gate lines GL may include first to fourth gate lines 231 to 234. The first gate line 231 may correspond to the gate electrode of FIG. 17 to which the data input signal D is applied. The first gate line 231 may correspond to the gates of the second PMOS transistor MP2 and the first NMOS transistor MN1. The second gate line 231 may correspond to the gate electrode of FIG. 17 to which the scan input signal SI is applied. The second gate line 231 may correspond to the gates of the fourth PMOS transistor MP4 and the third NMOS transistor MN3.

The third gate line 233 may correspond to the data input pin of FIG. 17 to which the data input signal D is applied. The third gate line 233 may correspond to the gate of the parallel stacked PMOS transistor MPp. Therefore, the data input signal D applied through the first and third gate lines 231 and 233 may be transferred at relatively higher speed. The fourth gate line 234 may correspond to the scan input pin of FIG. 17 to which the scan input signal SI is applied. The fourth gate line 234 may correspond to the gate of the parallel stacked NMOS transistor MNp. Therefore, the scan input signal SI applied through the second and fourth gate lines 233 and 234 may be transferred at a relatively higher speed.

Figure 19:
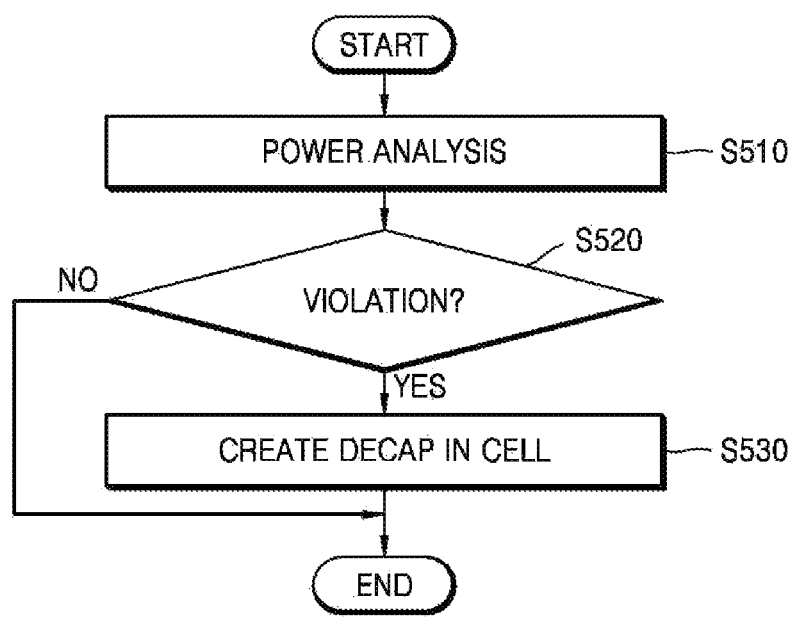
FIG. 19 is a flowchart of a method of designing an integrated circuit, according to an embodiment.

FIG. 19 is a flowchart describing of a design method for an integrated circuit according to an embodiment of the inventive concept.

Referring to FIG. 19, the design method assumes that execution of a simulation (e.g., a power analysis) S510 is used to determine whether or not one or more power constraint(s) have been violated S520. Upon determining that a design constraint violation has occurred, a decoupling capacitor may be created in a cell S530.

Here again, the cell may be a standard cell including at least one dummy gate line (e.g., a standard cell describing a scan flip-flop). The decoupling capacitor may be added to the redesign layout by adding a new active region under a dummy gate line, adding contacts at both sides of the dummy gate line in the new active region, and supplying the same voltage to the added contacts. In this case, the same voltage may be a power supply voltage or a ground voltage.

In some embodiments, operations S510 and S520 may not be performed and only operation S530 may be performed. In this case, a power analysis may not be separately performed and the decoupling capacitor may be created by using the dummy gate line included in the standard cell. Thus, it may be possible to reduce noise caused by voltage variation(s) in an integrated circuit by creating the decoupling capacitor in the standard cell. Also, it may be possible to remove necessity to separately include the decoupling capacitor cell by creating the decoupling capacitor using the dummy gate line in the standard cell, thus preventing an increase in the overall area of the integrated circuit.

Figure 20:
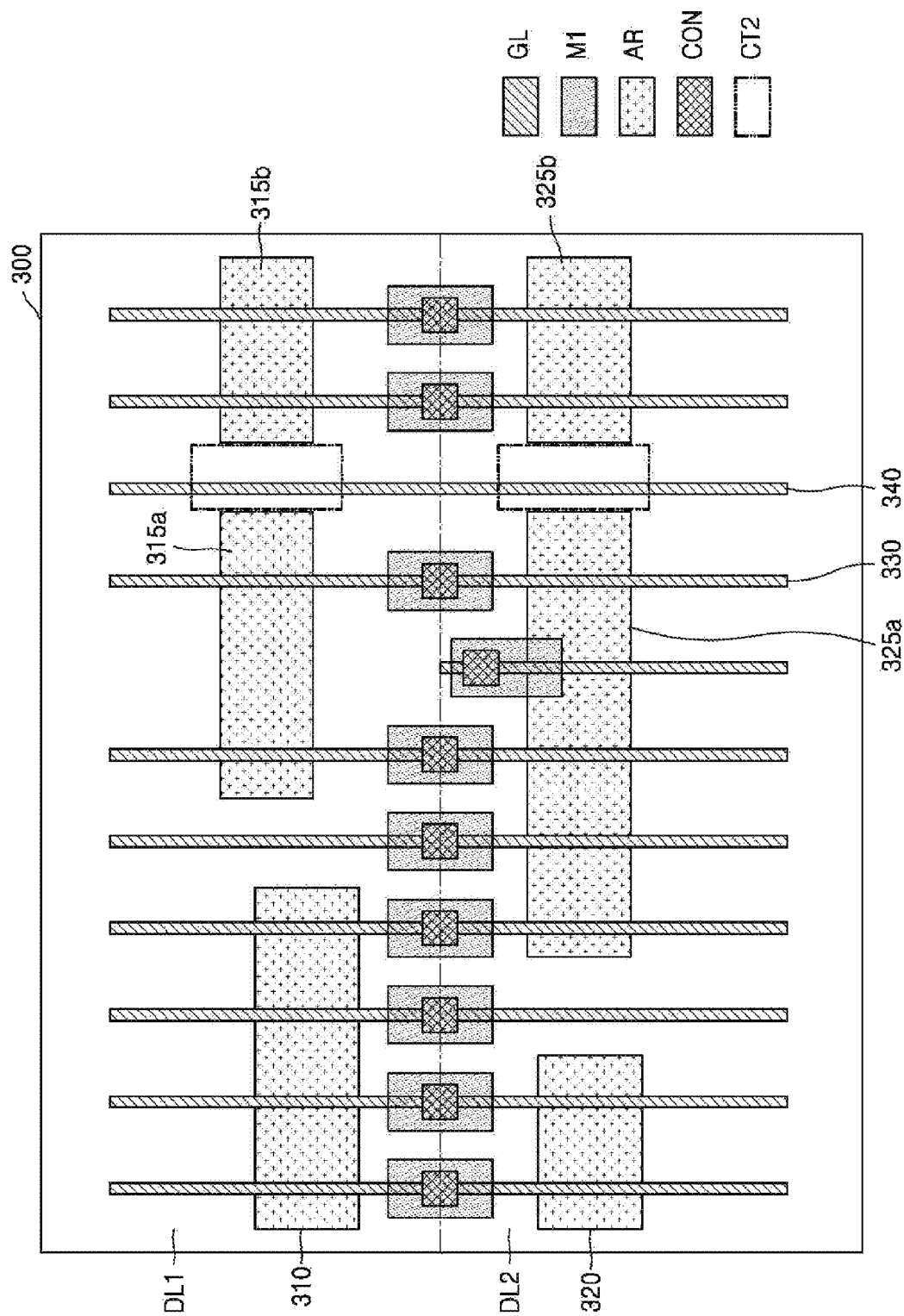
FIG. 20 illustrates a layout of a standard cell, according to an embodiment.

FIG. 20 illustrates an initial layout 300 of a standard cell. Thus, the initial layout 300 may be an original layout created according to input data defining the standard cell. When it is determined by the power analysis in operation S510 of FIG. 19 that the design constraint violation has not occurred, no redesign of the initial layout 300 is necessary, and the initial layout 300 may be passed to a manufacturing process.

The initial layout 300 may include active regions AR, gate lines GL, contacts CON, and first metal lines M1. Also, the layout 300 may further include second cutting areas CT2, where the second cutting areas CT2 may be a marking layer for cutting a portion of the active region AR.

The active regions AR may include first active regions 310, 315a, and 315b and second active regions 320, 325a, and 325b, which extend in a first direction. The first active regions 310, 315a, and 315b may be disposed in a first definition layer DL1 and the second active regions 320, 325a, and 325b, may be disposed in a second definition layer DL2. In the present embodiment, the first definition layer DL1 may be an N-well region, that is, a PMOS definition layer in which PMOS transistors are formed. The second definition layer DL2 may be a P-well region, that is, an NMOS definition layer in which NMOS transistors are formed. In the illustrated embodiment of FIG. 20, the first active regions 310, 315a, and 315b may be a diffusion layer formed by doping a first-conductivity-type impurity and the second active regions 320, 325a, and 325b, may be a diffusion layer formed by doping a second-conductivity-type impurity. In this case, the first conductivity type may be different from the second conductivity type.

The gate lines GL may extend in a second direction substantially perpendicular to the first direction and may be disposed in parallel in the first direction. The gate lines GL may correspond to gate electrodes of a semiconductor device. The gate electrodes may include a certain material with electrical conductivity, for example, polysilicon, a metal, or a metal alloy, but are not limited thereto. The gate lines GL may correspond to a trace with certain conductivity.

The first active regions 315a and 315b may be formed by disposing the second cutting area CT2 in one active region extending in the first direction on the first definition layer DL1, and the second active regions 325a and 325b may be formed by disposing the second cutting area CT2 in one active region extending in the first direction on the second definition layer DL2.

The gate lines GL may include first and second gate lines 330 and 340. The gate line 330 may be real gate lines disposed across the first and second active regions 315a and 325a. The second gate line 340 may be a dummy gate line disposed across a dummy region between the first active regions 315a and 315b and a dummy region between the second active regions 325a and 325b.

During a redesign of the initial layout 300, a new active region may be added under a dummy gate line (e.g., the second gate line 340), so as to supply a power supply voltage or a ground voltage to both sides of the dummy gate line. Hence, redesign may be performed on some regions included in the layout 300 (e.g., a peripheral region of a dummy gate line, or the second gate line 340. Thus, the size of a redesign layout need not substantially change from that of the initial layout 300.

Figure 21:
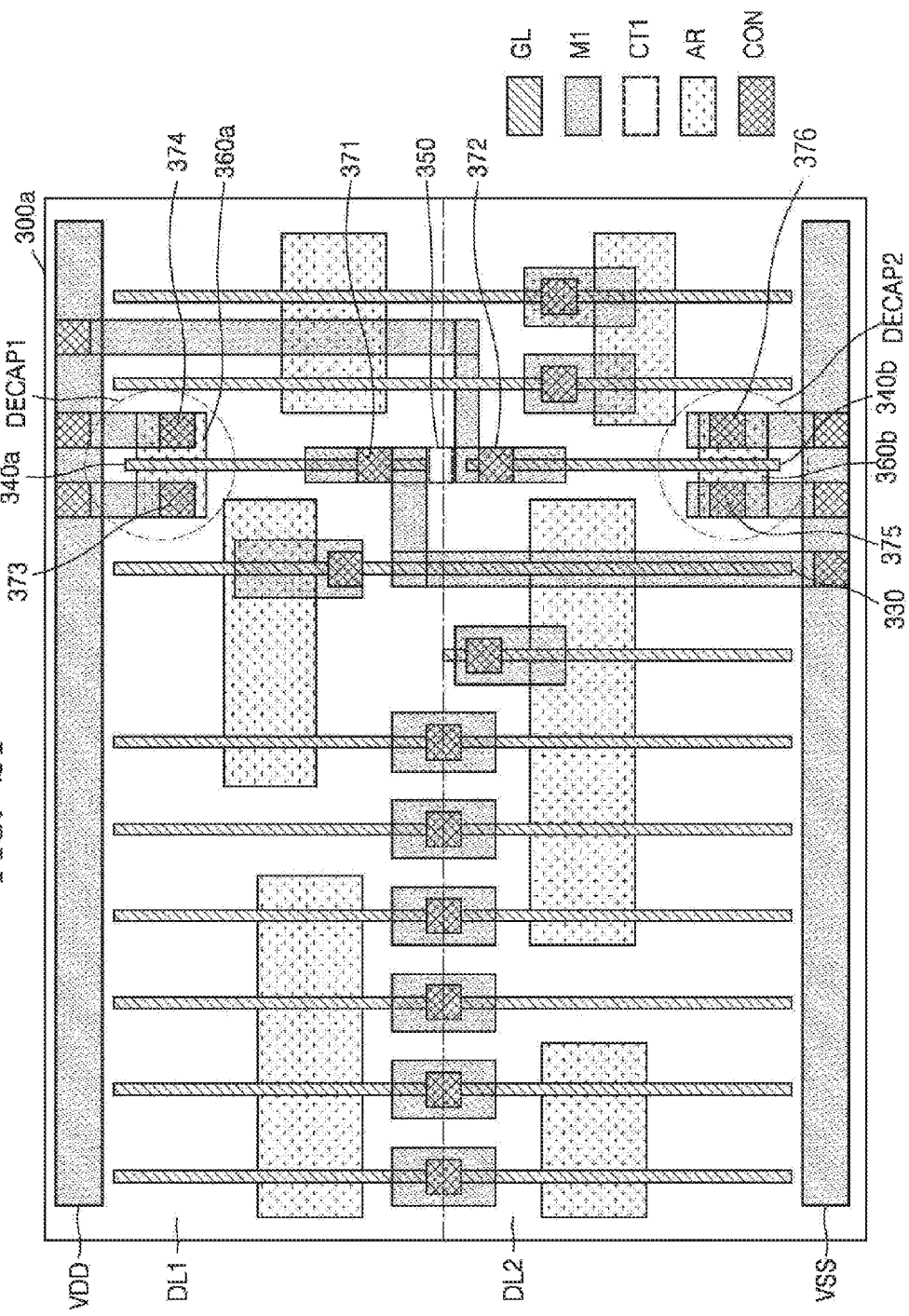
FIG. 21 illustrates a layout in which the standard cell of FIG. 20 is redesigned.

FIG. 21 illustrates a redesign layout 300a that may be obtained from the initial layout 300 for the standard cell of FIG. 20.

Referring to FIG. 21, the redesign layout 300a may be created by adding a decoupling capacitor in the cell according to operation S530 of FIG. 19.

A first cutting area 350 may be disposed in the central region of the second gate line 340 of FIG. 20. Accordingly, the second gate line 340 of FIG. 20 may be separated into first and second partial gate lines 340a and 340b. A contact 371 on the first partial gate line 340a may be connected to a ground voltage terminal VSS, and a contact 372 on the second partial gate line 340b may be connected to a power supply voltage terminal VDD.

A first new active region 360a may be added under the first partial gate line 340a, and contacts 373 and 374 may be added at the both sides of the first partial gate line 340a in the first new active region 360a. In this case, the contacts 373 and 374 may be connected to the power supply voltage terminal VDD. Therefore, the first partial gate line 340a and the first new active region 360a may constitute a first decoupling capacitor DECAP1.

A second new active region 360b may be added under the second partial gate line 340b, and contacts 375 and 376 may be added at the both sides of the second partial gate line 340b in the second new active region 360b. In this case, the contacts 375 and 376 may be connected to the ground voltage terminal VSS. Therefore, the second partial gate line 340b and the second new active region 360b may constitute a second decoupling capacitor DECAP2.

However, the illustrated embodiment of FIG. 21 is not limited thereto. In some embodiments, it may be possible to create a decoupling capacitor by using a plurality of dummy gate lines disposed adjacent to one another. For example, when the standard cell includes two dummy gate lines disposed adjacent to each other, for example, the first and second dummy gate lines, a new active region may be added under the first and second dummy gate lines, and contacts may be added in the left side of the first dummy gate line and the right side of the second dummy gate line in the new active region. In this case, the contacts may be connected to the power supply voltage terminal VDD or the ground voltage terminal VSS.

Figure 22:
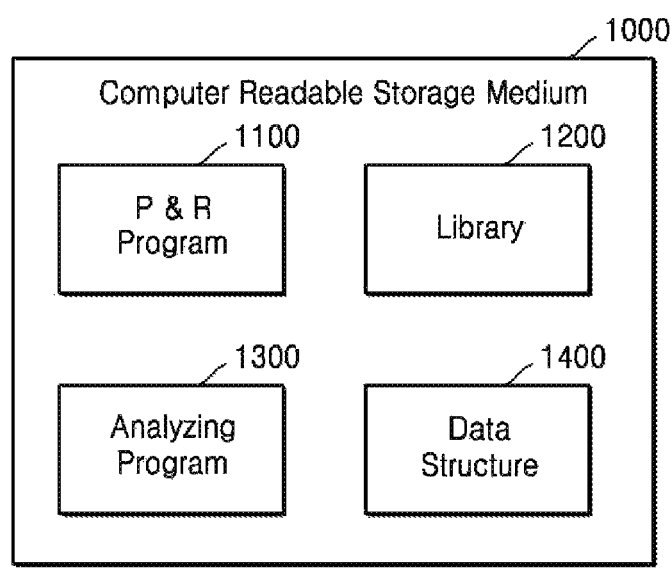
FIG. 22 is a block diagram of a storage medium storing a program for performing a method of designing an integrated circuit, according to an embodiment.

FIG. 22 is a block diagram illustrating computer readable storage medium 1000 that may be used within (or in configuration with) a computer to store one or more programs capable of performing a design method for an integrated circuit according to an embodiment of the inventive concept. The computer readable storage medium 1000 may be used to receive and store input data (e.g., a netlist), data associated with an initial layout, data associated with a redesign layout, and/or data associated with a final layout.

Referring to FIG. 22, the storage medium 1000 may be a computer readable storage medium and may include any storage medium that is readable by a computer when the storage medium 1000 is used to provide instructions and/or data to the computer. For example, the computer readable storage medium 1000 may include magnetic or optical media, such as disks, tapes, CD-ROM, digital versatile disk-ROM (DVD-ROM), compact disk-recordable (CD-R), compact disk-rewritable (CD-RW), digital versatile disk-recordable (DVD-R), or digital versatile disk-rewritable (DVD-RW), volatile or non-volatile memory such as RAM, ROM, or flash memory, non-volatile memory accessible via a USB interface, microelectromechanical systems (MEMS), or the like. The computer readable storage medium 1000 may be inserted into the computer, may be integrated into the computer, or may be connected to the computer via a communication medium, such as a network and/or a radio link.

As illustrated in FIG. 22, the computer readable storage medium 1000 may include a place and route (P&R) program 1100, a library 1200, an analyzing program 1300, and a data structure 1400. The P&R program 1100 may include a plurality of instructions for performing the method of designing the integrated circuit according to the layout created or redesigned according to the embodiments. For example, the computer readable storage medium 1000 may store the P&R program 1100 including certain instructions for designing the integrated circuit using the standard cell library including the standard cell illustrated in one or more of the drawings. The library 1200 may include information about the standard cell, that is, unit that constitutes the integrated circuit.

The analyzing program 1300 may include a plurality of instructions that perform a method of analyzing an integrated circuit based on data defining the integrated circuit. The data structure 1400 may include a storage space for management of data generated in the process of utilizing a standard cell library included in the library 1200, extracting specific information from a general standard cell library included in the library 1200, or analyzing characteristics of the integrated circuit by the analyzing program 1300.

In relation to the foregoing illustrated embodiments, a scan flip-flop may be included in a data processor, a scan test circuit or a computing system.

While the inventive concept has been particularly shown and described with reference to embodiments thereof, it will be understood that various changes in form and details may be made therein without departing from the scope of the following claims.

What is claimed is:

1. A computer-implemented method for designing an integrated circuit, the method comprising:
   receiving input data defining the integrated circuit characterized by at least one design constraint;
   performing a simulation using the input data to determine whether or not the at least one design constraint has been violated;
   upon determining that the at least one design constraint has not been violated, creating an initial layout based on the input data, wherein the initial layout includes at least one active area and at least one gate line and defines a size of the integrated circuit;
   upon determining that the at least one design constraint has been violated, creating a redesign layout by adding at least one cutting area to the initial layout without changing the size of the integrated circuit, wherein the adding at least one cutting area separates at least one of the at least one active area, and the at least one gate line; and
   storing at least one of the initial layout and the redesign layout in a non-transitory computer readable storage medium.

2. The method of claim 1, wherein the simulation is a timing analysis, the at least one design constraint is a plurality of timing constraints including a hold time and a setup time for a data input signal in relation to a clock signal.

3. The method of claim 2, wherein the integrated circuit is a scan flip-flop,
   the at least one active area comprises a first active region and a second active region extending in a first direction, the first active region having a first conductivity type and the second active region having a second conductivity type different from the first conductivity type, and
   the at least one gate line comprises a first gate line, a second gate line, and a third gate line extending in a second direction substantially perpendicular to the first direction, the first gate line corresponding to a data input pin receiving the data input signal and being disposed across the first active region and the second active region, the second gate line corresponding to a scan input pin and being disposed across the first active region and the second active region, and the third gate line being disposed across the second active region.

4. The method of claim 3, wherein the creating a redesign layout comprises:
   adding a dummy gate load on at least one of the data input pin and the scan input pin.

5. The method of claim 4, wherein the adding at least one cutting area to the initial layout comprises:
   adding a first cutting area to separate a partial region adjacent to the first gate line in the first active region;
   adding a first new gate line corresponding to the dummy gate load on the first cutting area; and
   connecting the first gate line to the first new gate line.

6. The method of claim 5, wherein the at least one gate line further comprises a fourth gate line adjacent to the second gate line,
   the adding at least one cutting area to the initial layout comprises:
      adding a second cutting area to separate a lower portion of the fourth gate line in the second active region, and
      adding a third cutting area to separate the fourth gate line into a first partial gate line and a second partial gate line; and
   the creating a redesign layout further comprises:
      connecting the second gate line to the second partial gate line disposed on the second cutting area and corresponding to the dummy gate load.

7. The method of claim 3, wherein the creating a redesign layout comprises at least one of:
   adding a first series stacked transistor to the initial layout proximate to the data input pin; and
   adding a second series stacked transistor to the initial layout proximate to the scan input pin.

8. The method of claim 7, wherein the creating a redesign layout further comprises:
   adding a first new gate line adjacent to the first gate line and constituting the first series stacked transistor on the first active region; and
   connecting the first gate line to the first new gate line.

9. The method of claim 8, wherein the at least one gate line comprises a fourth gate line adjacent to the second gate line, and a second cutting area separates a lower portion of the fourth gate line in the second active region, and
   the creating a redesign layout comprises:
      adding a third cutting area to separate the fourth gate line into a first partial gate line and a second partial gate line;
      adding a first new active region under the second partial gate line on the second cutting area; and
      connecting the second gate line to the second partial gate line,
      wherein the second partial gate line and the first new active region constitute the second series stacked transistor.

10. The method of claim 3, wherein the creating a redesign layout comprises at least one of:
    adding a first parallel stacked transistor to the initial layout proximate to the data input pin; and
    adding a second parallel stacked transistor to the initial layout proximate to the scan input pin.

11. The method of claim 1, wherein the at least one design constraint comprises a power noise constraint, and the performing a simulation comprises:
    performing a power analysis using the input data; and
    determining whether the power noise constraint has been violated.

12. The method of claim 1, wherein the initial layout comprises a dummy gate line, and the creating a redesign layout comprises adding a decoupling capacitor using the dummy gate line.

13. The method of claim 12, wherein the creating a redesign layout further comprises:
    adding a first cutting area to separate the dummy gate line into a first partial dummy gate line and a second partial dummy gate line;
    adding a first new active region extending in a first direction under the first partial dummy gate line;
    adding a second new active region extending in the first direction under the second partial dummy gate line;
    forming contacts connected to a power supply voltage terminal at both sides of the first partial dummy gate line in the first new active region;

forming contacts connected to a ground voltage terminal at both sides of the second partial dummy gate line in the second new active region;

forming a contact pattern connected to the ground voltage terminal on the first partial dummy gate line; and forming a contact pattern connected to the power supply voltage terminal on the second partial dummy gate line.

14. A computer-implemented method for designing an integrated circuit, the method comprising:

designing an initial layout for the integrated circuit to incorporate a standard cell by referencing the standard cell in a standard cell library stored in a non-transitory computer readable storage medium, wherein the standard cell comprises:

a first active region, a second active region and a third active region extending in a first direction;

gate lines extending in a second direction substantially perpendicular to the first direction;

a dummy gate line extending in parallel with the gate lines; and source/drain contacts disposed on opposing sides of the dummy gate line, wherein the source/drain contacts are disposed on the third active region and having a same voltage applied thereto, and the third active region is disposed under the dummy gate line, such that a combination of the dummy gate line and the third active region constitutes a decoupling capacitor within the integrated circuit.

15. The method of claim 14, further comprising:

redesigning the initial layout to create a redesign layout upon determining that the initial layout violates a design constraint established for the integrated circuit, wherein the redesigning the initial layout comprises:

adding a cutting area to separate the dummy gate line into a first partial dummy gate line and a second partial dummy gate line;

including a first gate contact disposed on the first partial dummy gate line and applying a ground voltage to the first gate contact; and including a second gate contact disposed on the second partial dummy gate line and applying a power supply voltage to the second gate contact.

16. A computer-implemented method for designing an integrated circuit, the method comprising:

performing a timing analysis on an initial layout for the integrated circuit, wherein the initial layout includes a data input pin and a scan input pin and defines a size of the integrated circuit; and upon determining as a result of the timing analysis that a hold time violation has occurred, creating a redesign layout based on the initial layout, wherein the redesign layout includes at least one of:

a dummy gate load added to the initial layout proximate to at least one of the data input pin and the scan input pin; and a series stacked transistor added to the initial layout proximate to at least one of the data input pin and the scan input pin.

17. The method of claim 16, wherein the creating a redesign layout based on the initial layout comprises:

adding a cutting area to the initial layout without changing the size of the integrated circuit, wherein the adding a cutting area separates at least one of an active region and a gate line; and storing at least one of the initial layout and the redesign layout in a non-transitory computer readable storage medium.

18. The method of claim 17, wherein the adding a cutting area to the initial layout comprises:

adding a first cutting area to separate a partial region adjacent to a first gate line in a first active region;

adding a first new gate line corresponding to the dummy gate load on the first cutting area; and connecting the first gate line to the first new gate line.

19. The method of claim 16, further comprising:

upon determining as a result of the timing analysis that a setup time violation has occurred, the redesign layout further includes a parallel transistor added to the initial layout proximate to at least one of the data input pin and the scan input pin.

20. The method of claim 16, wherein the initial layout is an original layout.

* * * * *